United States Patent
Eben et al.

(12)

(10) Patent No.: US 7,152,542 B2
(45) Date of Patent: Dec. 26, 2006

(54) AIR SEED METER

(75) Inventors: Mark H. Eben, Walford, IA (US);
Lisle J. Dunham, Grinnell, IA (US);
Alan F. Barry, Fairfax, IA (US)

(73) Assignee: Kinze Manufacturing, Inc.,
Williamsburg, IA (US)

( * ) Notice: Subject to any disclaimer, the term of this patent is extended or adjusted under 35 U.S.C. 154(b) by 0 days.

(21) Appl. No.: 11/495,446

(22) Filed: Jul. 28, 2006

(65) Prior Publication Data

US 2006/0266269 A1    Nov. 30, 2006

Related U.S. Application Data

(62) Division of application No. 11/024,145, filed on Dec. 28, 2004, now Pat. No. 7,093,548.

(60) Provisional application No. 60/533,349, filed on Dec. 29, 2003.

(51) Int. Cl.
*A01C 7/00* (2006.01)
*A01C 9/00* (2006.01)

(52) U.S. Cl. .................................... 111/185
(58) Field of Classification Search ................ 111/174, 111/177–185; 222/414, 410, 394
See application file for complete search history.

(56) References Cited

U.S. PATENT DOCUMENTS 6,247,418 B1 *  6/2001  Dunham ..................... 111/185

* cited by examiner

*Primary Examiner*—Christopher J. Novosad
(74) *Attorney, Agent, or Firm*—Emrich & Dithmar LLC

(57) ABSTRACT

An air seed meter for an agricultural planter includes a vacuum cover which has a central opening which exposes the central portion of the seed disc to the exterior. The central opening of the vacuum cover is centered on a location offset from the axis of rotation of the seed disc. This reduces disc wear at the disc-vacuum cover interface, and renders the disc more accessible for self-cleaning, visual inspection and verification of the proper disc. Openings in the central, open portion of the disc, the back wall of the seed housing and the side wall of the seed housing cooperate to equalize the air pressure in the seed reservoir to atmospheric pressure and reduce or eliminate reverse air currents in the discharge chute. An adjustable brush with three separate stations cooperates with an edge-release, beveled disc to apply a progressively more forceful singulation force to eliminate duplicate seeds.

6 Claims, 23 Drawing Sheets

AIR SEED METER

RELATED APPLICATIONS

This is a divisional application of and claims the benefit of U.S. application Ser. No. 11/024,145 for "AIR SEED METER", filed Dec. 28, 2004 now U.S. Pat. No. 7,093,548. This application also claims the benefit of U.S. Provisional Application No. 60/553,349 filed on Dec. 29, 2003 for "AIR SEED METER".

FIELD OF THE INVENTION

The present invention relates to improvements in air seed meters of the type used to meter and "singulate" seeds in row units for agricultural planters. Air seed meters which use atomospheric pressure on the seed reservoir side of a rotating disc and a pressure below atmospheric pressure on the "vacuum" side (the pressure differential maintaining seeds on a rotating disc from a seed reservoir to a discharge location), are frequently referred to as "vacuum" meters, to distinguish them from seed meters which use a differential pressure generated by atmospheric pressure and a pressure greater than atmospheric pressure to retain the seeds on the disc ("positive pressure" meters).

The principles of the present invention relate to air seed meters in general, whether the pressure differential securing the individual seeds to a disc is created by a sub-atmospheric pressure on the vacuum side of the disc, or whether a positive pressure (above atmospheric pressure) is generated in the seed reservoir to secure the seeds to the disc. However, subsequent discussion and description will relate to the "vacuum" type of meter. Persons skilled in the art will readily be able to adapt or apply the structure and operation disclosed to the positive pressure type of meter. As used herein, the word "singulate" refers to separating one seed from a group or large number of seeds, typically stored in a reservoir. Singulation is typically used for more expensive seeds, to conserve costs, and to achieve the desired plant spacing for achieving maximum yield potential.

BACKGROUND OF THE INVENTION

Air seed meters have been known in the art for some time. One current commercial air seed meter uses an enclosure for the disc having a first housing section forming a reservoir for the seeds and receiving and enclosing the seed side of the disc, and a second housing section, connected to the first housing section for contacting and enclosing the vacuum side of the disc. The second housing section forms a vacuum chamber, in the case of an air meter employing suction to secure the seeds to the disc.

In most cases, two housing sections form the overall meter casing, are in the form of flat, circular end walls (i.e. disc-shaped) with generally cylindrical side walls. The housing sections or halves are mounted with the centers of the end plates concentric with the axis of rotation of the disc. Moreover, in prior art meters, for the most part, a seal is formed between the vacuum cover and the seed disc.

The seed disc is driven typically for rotation about a generally horizontal axis. As the disc, having spaced seed apertures located circumferentially about the disc, is rotated through the seed reservoir, seeds are picked up and attached to an aperture by means of a pressure differential between the seed reservoir and the vacuum chamber. The seeds are held to the disc by the pressure difference as they pass through the seed reservoir. The seed is passed to a discharge area which, typically, is located adjacent a downwardly facing chute formed as a tangential channel in the meter housing.

In prior art air seed meters which seek to establish a seal between the vacuum housing and the rotating disc, the seal extends around the periphery of the portion of the vacuum housing which forms the actual vacuum chamber. That is, a portion of the vacuum chamber typically is devoted, in prior art devices, to a point for releasing the seeds sequentially into the discharge chute. This is done, in some cases, by having the seeds pass into a region adjacent the discharge chute. The "vacuum" (i.e. lower pressure) side of the disc, as it passes adjacent the discharge chute, naturally is exposed to air pressure near, but not always at atmospheric levels.

There are some difficulties associated with such arrangements. First, it is desirable to establish atmospheric pressure at the actual point of discharge. For example, the higher the air pressure differential across the seed disc at the moment of discharge, the less would be the tendency to release the seed at the same location accurately. Any variation in the pressure differential across the seed disc at the intended point of release, will create variances in the spacing of the seeds upon discharge and deposit into the seed furrow. According to these structures, it became necessary, in some cases, to create an elaborate sealing mechanism which defined only the boundary of the vacuum chamber and excluded the region of release adjacent the discharge chute.

Still further problems existed in that a "chimney effect" may be created in the discharge chutes of some existing meters. By this it is meant that as seed is routed to the release point in the discharge chute, it will be appreciated that the reservoir side of the seed disc is at approximately atmospheric pressure; and if measures are not taken, the interior of the seed reservoir may be at a slightly sub-atmospheric pressure. This also increases the likelihood that air is drawn up the discharge chute (i.e. if the reservoir is at a pressure even slightly below atmospheric), resulting in a "chimney effect"or updraft of air in the discharge chute and requiring compensation. The chimney effect not only reduces the reliability of accurate seed release, and therefore spacing, but depending upon the velocity of air flowing in a reverse direction in the seed discharge chute, it might alter the discharge flight path of the seed, thereby further affecting the fall time (and ultimate spacing) of seeds.

Some prior art seed discs which use recesses or "cells" in the surface of the disc to capture and seat seeds experience another source of possible inconsistent or unequal seed spacing upon delivery to the furrow. Specifically where the seed is required to move axially of the disc (i.e. parallel to the axis of rotation) to release, there is an increased tendency for the seed to strike the wall of the discharge chute and to ricochet off the walls of the chute and to be delayed in release from the cell. This effect creates variation in the length of seed travel (and thus variations in delivery time) from release to deposit, and thus results in inconsistency in seed spacing in the furrow.

Other seed discs, which do not have recesses or depressions in the seed disc for retaining seeds, require the use an auxiliary device, some shaped like a spider with wire legs, to agitate and bring the seeds in the reservoir up to the speed of the disc to facilitate seating of the seeds on the disc.

Another difficulty with such prior art air meters as described above, is that for the most part, the seal between the disc and the vacuum housing is generally a circular path centered on the axis of rotation of the disc and located at the perimeter of the disc. In such structures, the portion of the disc engaging the circular seal tends to create a narrow annular region of engagement between the seal member and the disc or seal, thus creating a narrow band of wear on the disc. This wear "ring" creating wear on the disc or seal, results in a variance between the surface of the disc which was attempted to be sealed and the contact surface of the seal, thus reducing the effectiveness of some seals.

Moreover, such prior art structures rendered it difficult to clear the interior of the vacuum chamber as well as the exterior from fine particles, dust, dirt and chips or broken segments of seeds that may have cracked (collectively referred to as "debris" or "fines"). Such particles could pass through or obstruct the apertures in a seed recess and may even accumulate between contacting surfaces where it was difficult, due to the nature of some prior devices, to clear the debris. Some prior art devices, such as disclosed in U.S. Pat. No. 6,247,418, created tiny slots between a seal of the vacuum housing and the disc so that air could flow across the seal through the groove in the adjacent surface of the disc between the contact surfaces to clear the disc and seal surface of fine particles. However, the cross section of such slots tended to reduce, with diminished clearing effect, as the sealing member wore into the surface of the disc, thereby reducing the dimensions in and effectiveness of the clearing passageways.

SUMMARY OF THE PRESENT INVENTION

The present invention includes a vacuum cover which has a semi-toroidal shape, but which is not a completely closed shape. By this, it is meant that the vacuum chamber extends partially but not completely about the periphery of the main seed housing of the meter, (thus making the vacuum housing "segmented" in the sense that it does not extend completely about the circumference of the seed reservoir housing). Moreover, the vacuum cover of the present invention does not have a flat, disc-shaped outer wall and a generally cylindrical side wall so as to match, in general, the housing for the seed reservoir. Rather, in radial cross section, the vacuum housing of the present invention has a general U-shape, forming an enclosure extending partially about the periphery of the disc and having spaced, opposing end walls.

The shape of the vacuum housing provides a closed wall having two perimeters for engaging the remainder of the meter. The outer perimeter of the vacuum housing, which is generally circular, is located outwardly of the seed openings in the disc and that conforms in general to the outer perimeter of the seed housing and provides a flange for mounting to the seed meter housing and partially enclosing the disc. The inner edge of the vacuum cover lies inwardly of the seed openings in the disc, and is also curved to define a central opening which is generally circular. The center of this central opening in the vacuum cover, however, is not concentric with the center of the disc, which defines the axis of rotation of the disc. The central opening of the vacuum cover is smaller in diameter than the disc; and the center of the central opening is off-set or eccentric relative to the axis of rotation of the disc which is at the center of the disc. This arrangement has the advantage that the region of engagement between the disc and the vacuum cover defined by the contact area between the two is not a narrow, annular or circular region on the disc. Rather, as the disc rotates, the circular contact area between the inner edge of the vacuum cover and the disc moves progressively in a non-concentric manner about the disc, thus distributing or spreading out the total area of contact between the two, and reducing the wear per unit area of contact.

The inner curved contact surface of the vacuum cover is provided with several spaced segments, each including a series of circumferential grooves (that is, they are spaced in alternate fashion with contact surfaces from the center toward the periphery). In the illustrated embodiment, each sealing segment has three such grooves which form curved areas which do not engage the disc. This design further reduces the surface contact between the disc and the associated portion of the vacuum meter housing and enhances the sealing function of each sealing segment while reducing wear on the disc.

Moreover, generally radial slots are provided between adjacent sealing segments of the inside edge of the vacuum cover. These slots separate the grooved sealing segments and extend generally radially of the central opening of the vacuum cover, but they are slightly inclined relative to a radius. Specifically, the slots extend outwardly and slightly incline in the direction of rotation of the disc when proceeding from an inner location to an outer location. Further, the slots are enlarged in cross sectional area proceeding from inner to outer locations. Thus, the slots are less likely to become clogged with fines; and the fines are delivered in a direction facilitating their being entrained in the air flow into the vacuum chamber from which they are evacuated. This permits the innermost central opening of each clearing slot to clear the central open area of the disc by permitting fines to be drawn into the vacuum chamber and evacuated. It also prevents the fines from getting caught between contacting adjacent surfaces of the disc and vacuum cover.

It will thus be appreciated that the combination of spaced, grooved sealing segments on the inner contact edge of the vacuum cover, together with the inclined, radial slots separating the sealing segments do not form a complete seal between the cover and the disc. Rather, what is formed is what is referred to as an "air dam" or controlled air barrier between the external atmosphere and the interior of the vacuum chamber, permitting a continuous, controlled flow of air from the atmosphere into the interior of the vacuum chamber for purging the contact region between the disc and inner edge of the vacuum cover of debris and clearing the central, exposed portion of the disc adjacent the disc/vacuum cover contact. This arrangement also aids in controlling undesired leakage of air, and it extends the useful life of the disc.

Another area in which the present invention improves on prior designs of air seed meter is in establishing a more uniform pressure differential between the two surfaces of the seed disc by establishing a uniformity of atmospheric pressure throughout the seed reservoir. This is accomplished by designing air inflow to the seed reservoir to compensate to air lost to the vacuum. In one aspect, a slotted insert is provided to overlay a large aperture on the back wall of the seed housing. The slots are sized such that they contain the seeds in the reservoir, but they are extended in length to permit air to flow inwardly over an extended region. Secondly, an opening is formed in the side wall of the seed housing adjacent the entrance of the discharge chute to reduce any "chimney" effect described above. In addition, if desired, the disc may be provided with additional apertures located in the central portion of the disc, which is located in the central opening of the vacuum cover when the disc and vacuum cover are assembled. In combination, these features permit make-up atmospheric air to flow into the reservoir over a distributed area to equalize atmospheric pressure within the seed reservoir over a wide range of operating conditions.

Another area of improvement in the present invention is in the singulation of seeds. This is accomplished by locating the seed cells extending to the periphery of the disc so the seeds do not have to move axially of the disc when released to clear the cell, and by providing, for each seed cell, a seed aperture or orifice extending through the disc for communicating the vacuum source with the reservoir for securing the seed. In addition, adjacent each seed orifice (in the corn disc) communicates with a pair of seed recesses in the reservoir side of the disc including a circumferential recess extending in the direction of rotation, and a radial recess extending radially inward toward the center of the disc. The circumferential recess facilitates seating of a seed and guidance of the seed into communication with the seed orifice and then securing the seed once seated and singulated. The radial recess extends from the seed orifice toward the center of the disc and it promotes removal of duplicate seeds, in combination with the singulator mechanism.

The singulator mechanism of the present invention comprises a series of three brushes extending radially inwardly of the disc and inclined slightly in the direction of rotation of the disc when proceeding inwardly of the periphery of the disc. Each brush comprises two sets of bristles and tends to dislodge a duplicate seed if it is present and competing for a seat. It has been found that the inclusion of three separate, spaced brushes enhances the accuracy of the meter by rejecting duplicates, usually at the first two brush stations, yet permitting each orifice to be filled with a seed.

The brushes of the singulator are mounted in a single body which is adjustable radially of the seed disc by means of a lever accessible, externally of the meter. The brushes are arranged for progressively more aggressive singulating action. The adjustment lever is easily accessible and quickly, conveniently and accurately manipulated. The outer edge of the seed disc is beveled so that the singulating brushes may extend more easily inwardly of the disc to engage and dislodge duplicate seeds from the seed cells, and to facilitate radial movement of the seeds as they are released.

Other features and advantages of the present invention will be apparent to persons skilled in the art from the following detailed description of the illustrated embodiment wherein identical reference numerals will refer to like parts in the various views.

BRIEF DESCRIPTION OF THE DRAWINGS

As used herein, "right" and "left" refer respectively to the left and right side of a planter row unit or meter from the viewpoint of an observer standing to the rear of the planter and facing in the direction of travel. Further, "front" refers to the direction the observer faces—i.e. the direction of forward travel of the planter. These references are optional and solely for convenience of description.

DETAILED DESCRIPTION OF THE ILLUSTRATED EMBODIMENT

Figure 1:
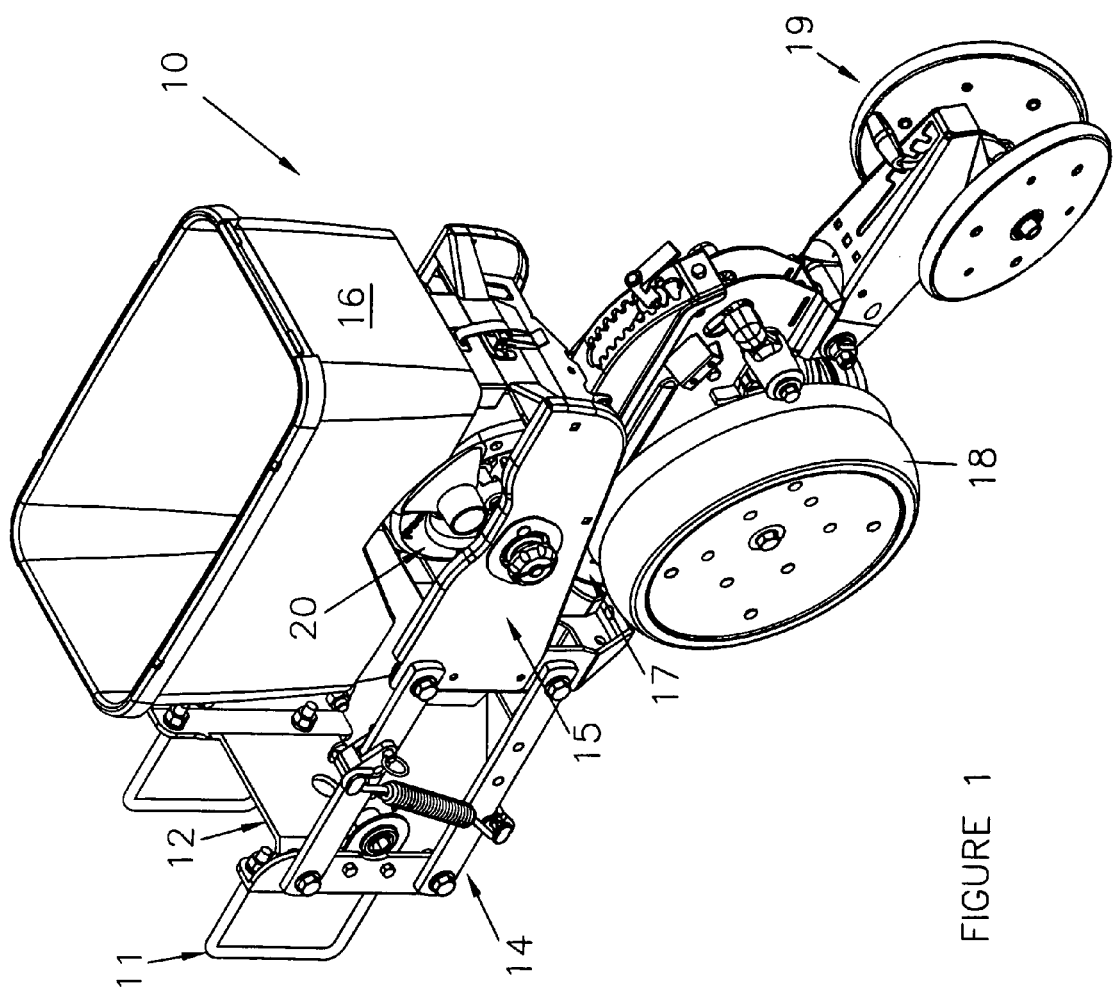
FIG. 1 is a perspective view of a planter row unit incorporating the present invention taken from the upper, rear and left side of the unit.

Referring first to FIG. 1, reference numeral 10 generally designates a planter row unit incorporating the air seed meter of the present invention. Briefly, the row unit 10, aside from of the inventive air seed meter is known in its general aspects to persons skilled in the art. The row unit includes a U-bolt mount generally designated 11 for mounting the row unit to a conventional planter frame or tool bar, as it is sometimes called, which may be a steel tube of 5 by 7 inches (although other sizes are used, as well).

Figure 2:
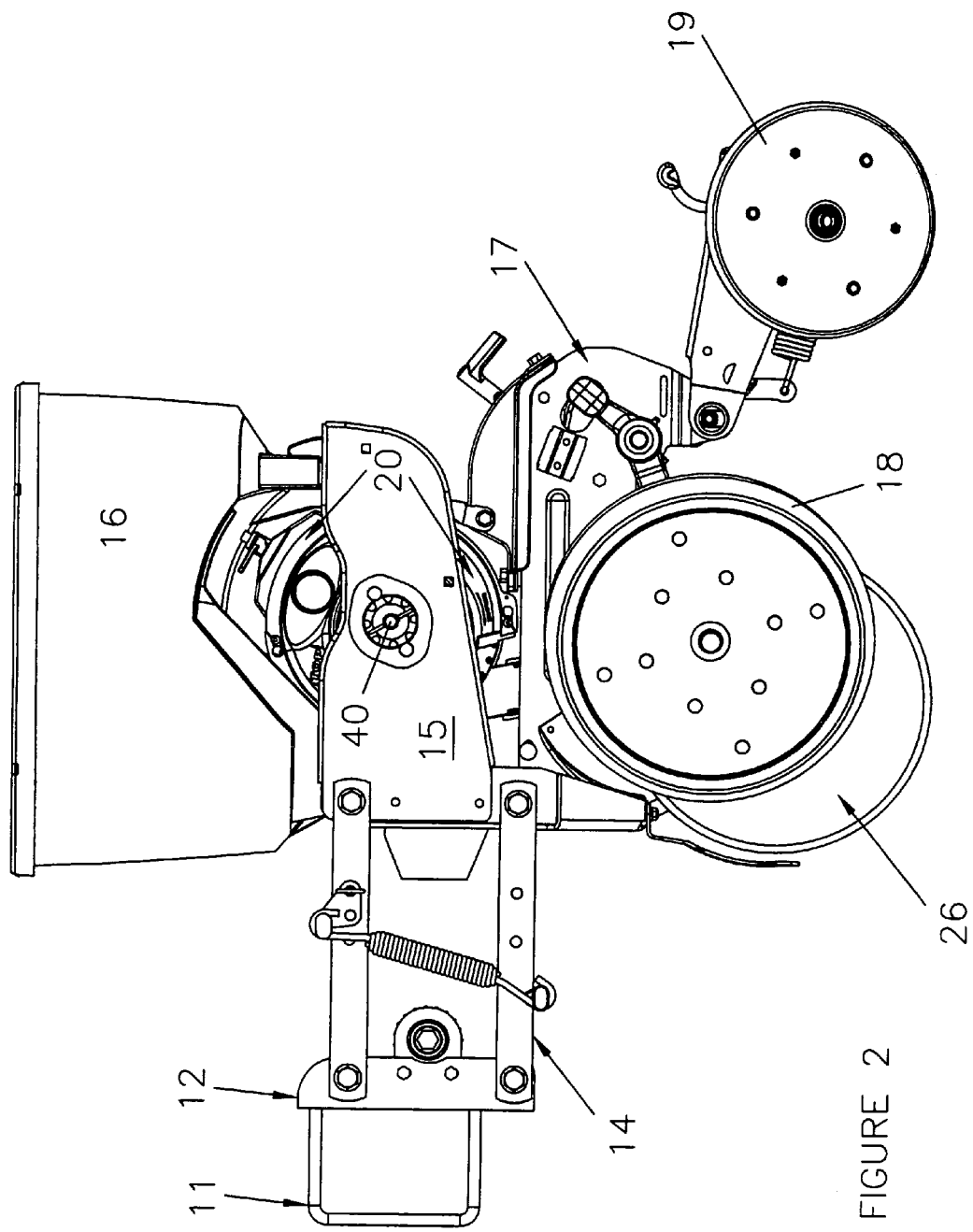
FIG. 2 is a left side elevational view of the row unit of FIG. 1.

The mount 11 includes a faceplate generally designated 12 which is used to mount left and right side parallel linkages, each linkage being a four-bar linkage such as the left one seen in FIG. 1 and generally identified by reference numeral 14. The double linkage is sometimes described as having upper parallel links and lower parallel links, and the rear ends of all four parallel links are pivotally mounted to the frame of the row unit generally designated 15. The frame 15 includes a support for a seed hopper 16, as well as a structure including a shank weldment generally designated 17 for mounting a pair of ground-engaging gauge wheels, one of which is shown at 18, as well as a furrow closing unit generally designated 19 which includes a pair of inclined closing wheels. The row unit also includes a pair of furrow opener discs designated 26 in FIG. 2.

As is well known in the art, seed is placed in the hopper 16 and fed to a meter, a portion of which is seen at 20 in FIG. 1. The meter 20 singulates and deposits seed as the row unit is pulled along, into a furrow prepared by a conventional disc opener 26 placed between and extending in front of the gauge wheels 18. The furrow is then closed, after the seed is deposited, by the closing wheels 19.

Figure 3:
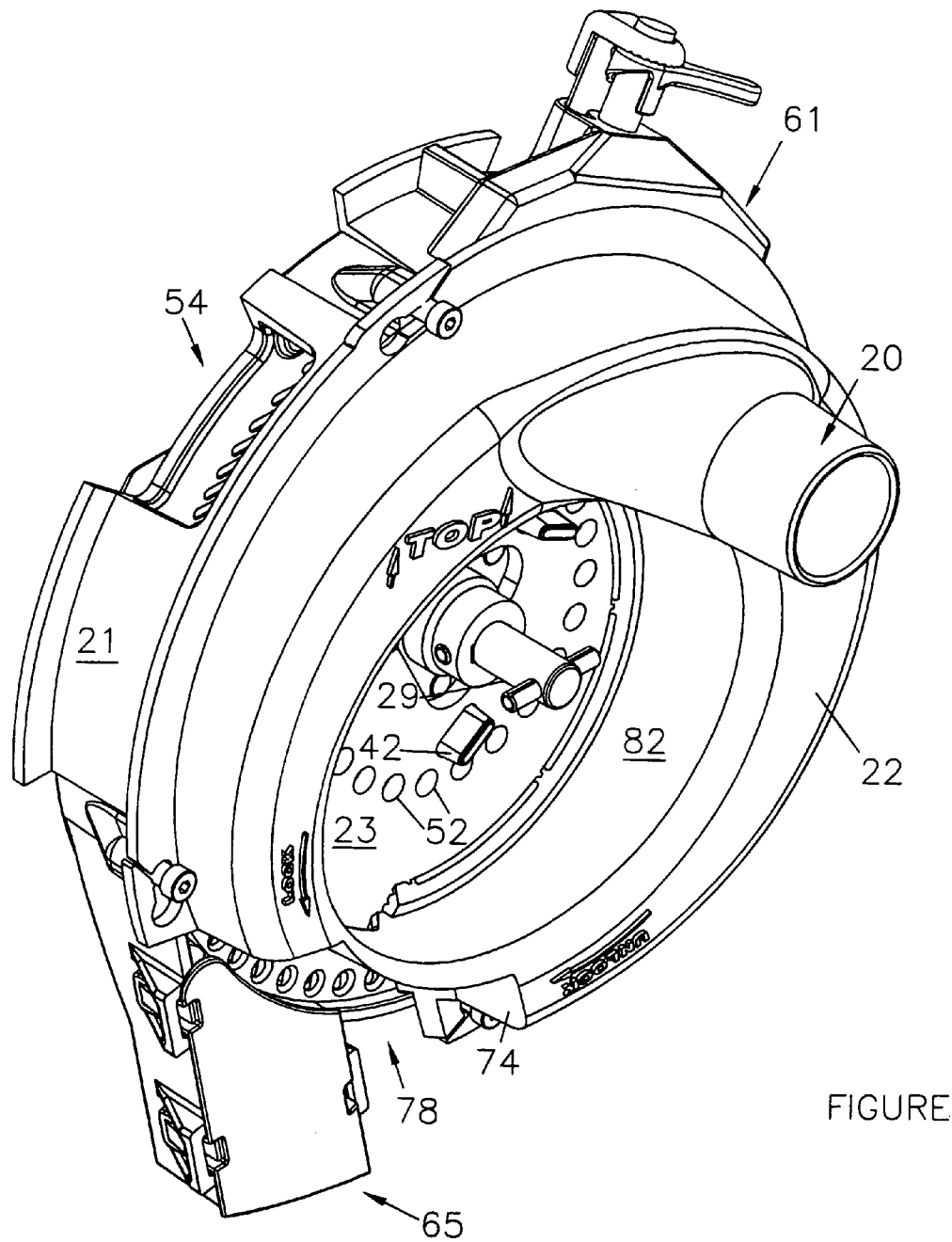
FIG. 3 is an upper, frontal and left side perspective view of an air seed meter incorporating the present invention.
Figure 3A:
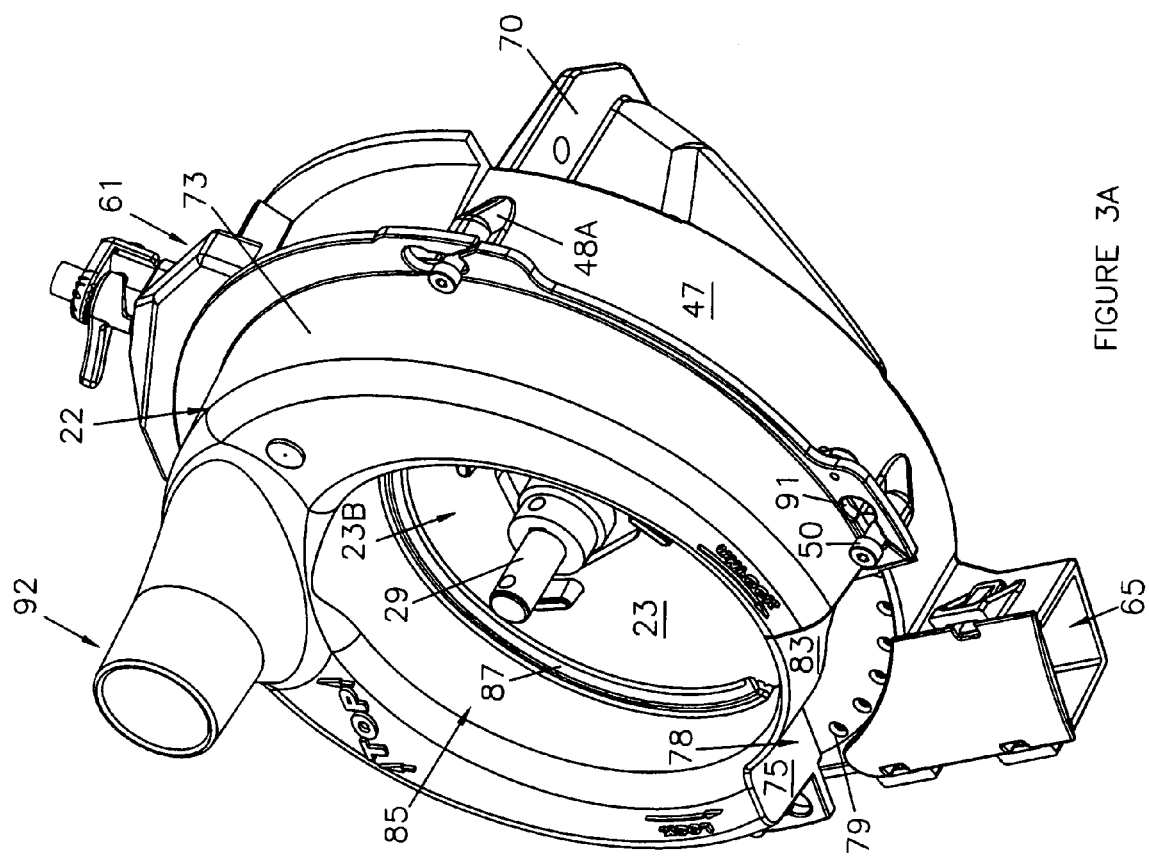
FIG. 3A is a lower, rear left side perspective view of the seed meter of FIG. 3.

Turning now to FIGS. 3 and 3A, there is shown, in perspective view, a seed meter 20 constructed according to the present invention. The seed meter 20 includes a housing 21 which receives seed from the hopper 16 and forms a seed reservoir, and a removable vacuum cover generally designated 22.

Figure 4:
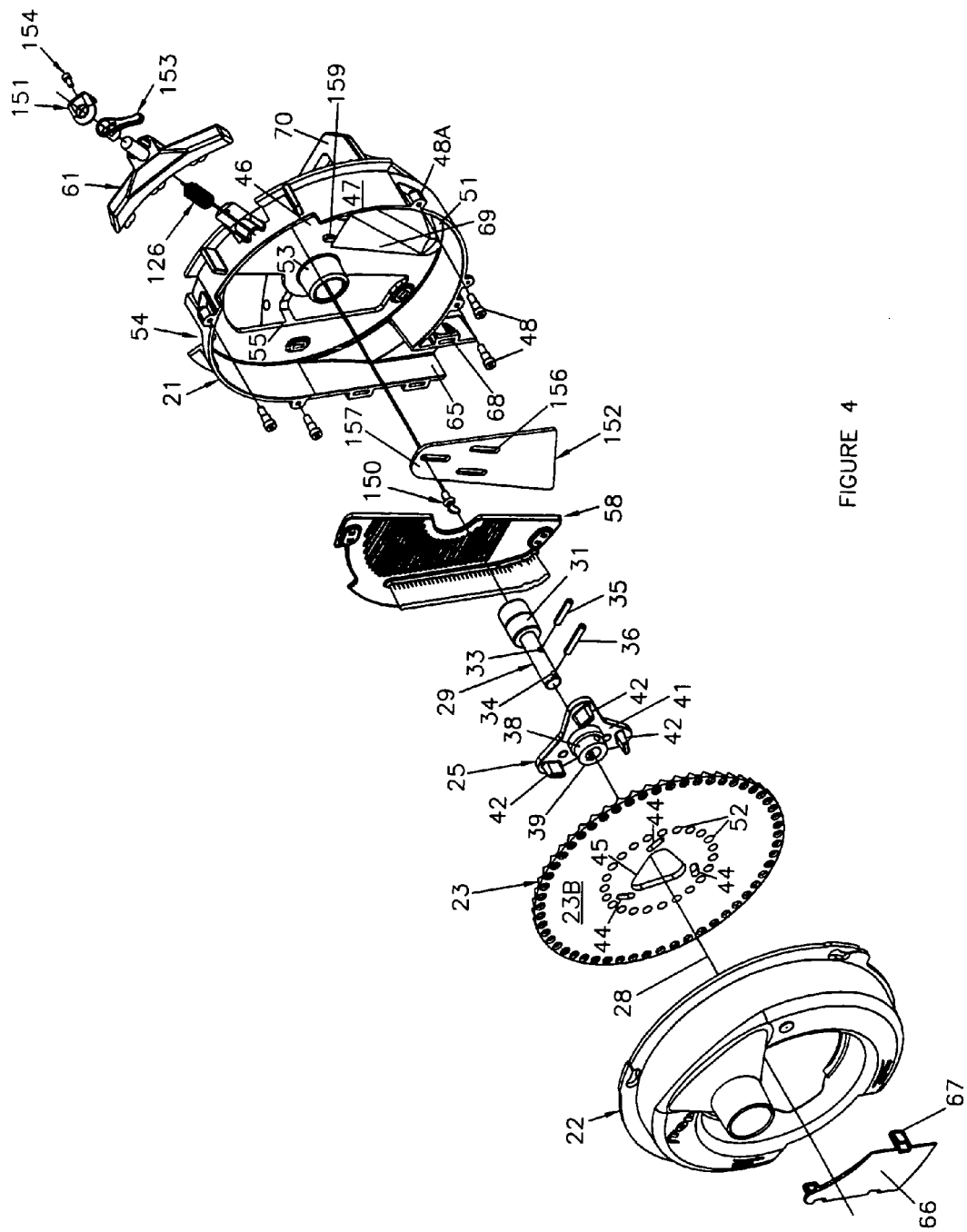
FIG. 4 is a perspective view taken from the upper, rear and left side of the meter of FIG. 3 with some components shown in exploded relation.
Figure 5:
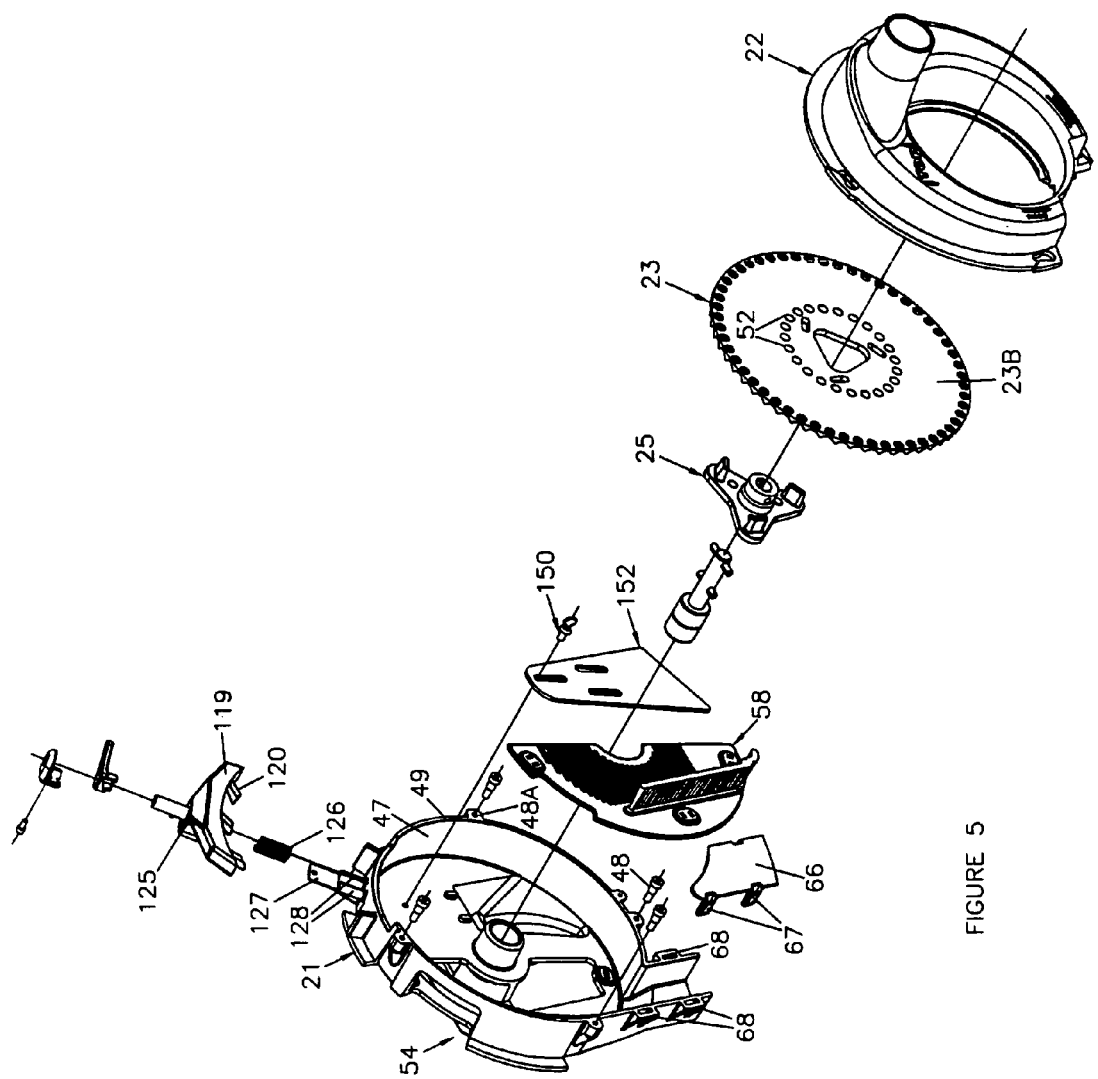
FIG. 5 is a perspective view of the meter of FIG. 3 taken from the front and left side, again with some components in exploded relation.

Referring to FIGS. 4 and 5, the major components of the seed meter 20 are shown in exploded relation. To the lower left of FIG. 4 is the vacuum cover 22 which is located on the outer or left side of the meter. A seed disc 23 is driven by a hub 25. Hub 25 engages the disc 23 and drives it in rotation (counter clockwise as seen in FIG. 4) about a horizontal axis identified by reference numeral 28. The hub 25 is mounted to a shaft 29 which is fitted with a bearing 31. The shaft 29 is provided with a pair of bores 33, 34 which receive pins 35, 36 respectively. Pin 35 mounts the hub 25 to the shaft 29 by means of a collar 38, which is also provided with a pair of apertures one being designated 39 in FIG. 4. The apertures 39 of the collar 38 are aligned with the aperture 33 of the shaft 29 to receive the pin 35. The aperture 34 and pin 36 of the shaft 29 are used to mount the shaft 29 to a drive coupling on the planter. The drive shaft is designated 40 in FIG. 2.

Referring now to the hub 25, it includes a plate 41 which includes three lobes, each having a tapered drive lug 42. The tapered drive lugs 42 are received in elongated apertures 44 of the disc 23 (see FIG. 3). The apertures 44 are spaced equally from a central opening 45 of the disc 23 which receives the collar 38 of the hub 25. The taper of the lugs 42 is such that they are wider toward the base (i.e. plate 41) so that the lugs engage and enter the openings 44 of the disc 23 and urge the disc toward the vacuum cover 22 when the meter is assembled. In this manner, the disc 23 is closely adjacent and urged toward an inner flange of the cover 22, to be described, so that there is contact between the two. When the vacuum is applied, the disc 23 is drawn into more intimate contact with the cover 22 to maintain a subatmospheric pressure ("vacuum") within the cover 22, as will be further described within. The drive coupling connects to the shaft 29 from the outer side of the meter, as seen in FIG. 3 by the operator or maintenance personnel and connecting the planter drive to the meter.

It will be observed from FIGS. 3 and 4 that each of the drive lugs 42 is elongated laterally and inclined relative to a radial line extending from the axis of rotation 28. In the illustrated embodiment when viewed from the left (outer) side of the meter and as seen in FIG. 4, the rotation of the disc is counter-clockwise. The inclination of the drive lugs 42 relative to a radial line or plane is that the direction of elongation of the lugs extends closer to the axis of rotation when moving in the angular direction of rotation. The receiving apertures 44 of the disc 23 are similarly oriented and have the same cross-sectional shape. This arrangement insures that the disc cannot be mounted in driving relation with the hub 25 if the surfaces of the disc 23 are reversed. In other words, the vacuum surface of the disc (the surface 23B seen in FIG. 4) must face outwardly and the reservoir side of the disc 23A in FIG. 5) must face inwardly of the meter in order for proper driving engagement between the hub and disc to be established. This prevents improper assembly of discs in the meter. Moreover, the drive lugs 42 are tapered in an axial direction, being reduced in cross-section proceeding axially toward the disc.

Figure 9:
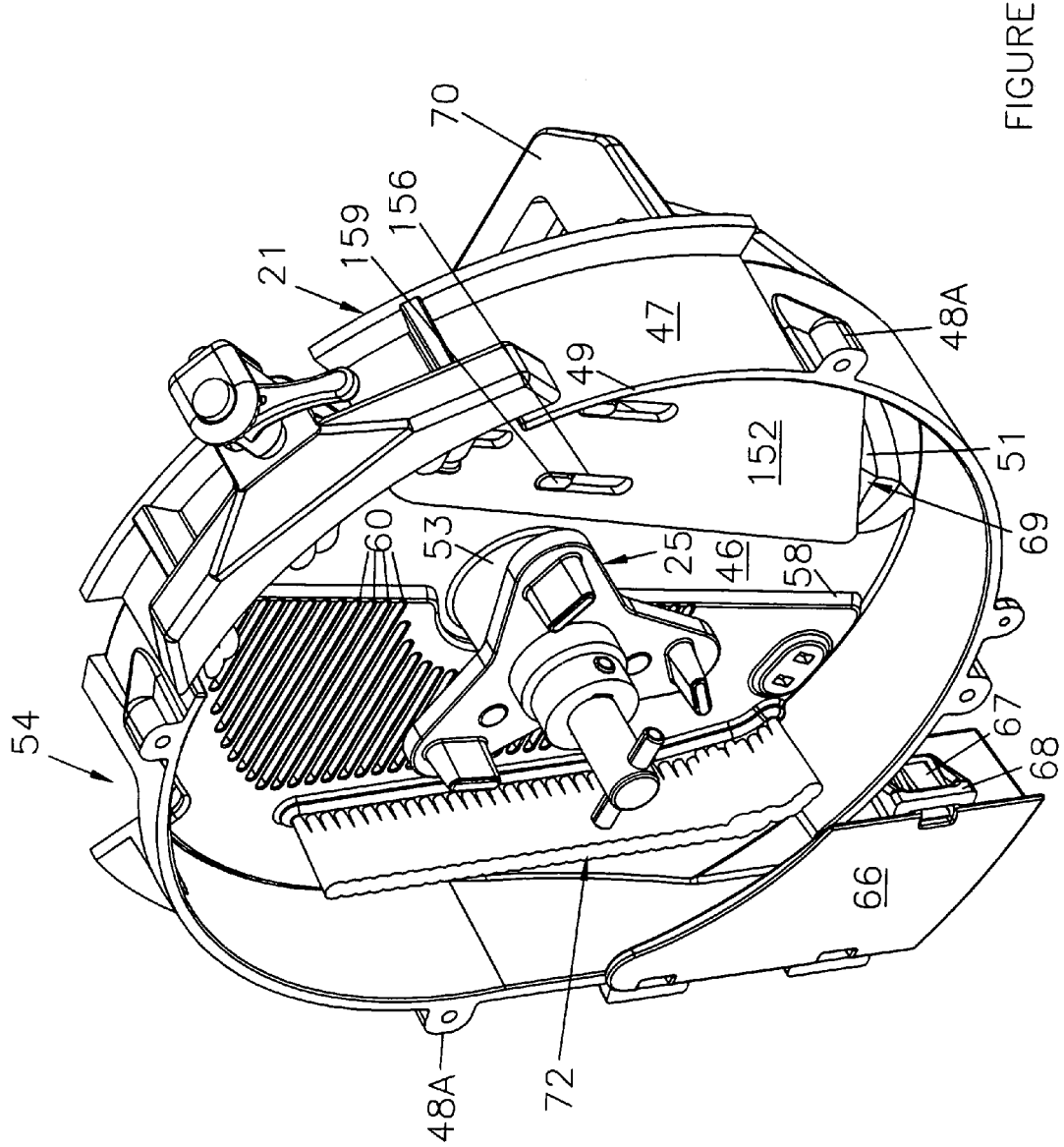
FIG. 9 is an upper, rear perspective view of the interior of the housing of the meter of FIG. 3.
Figure 10:
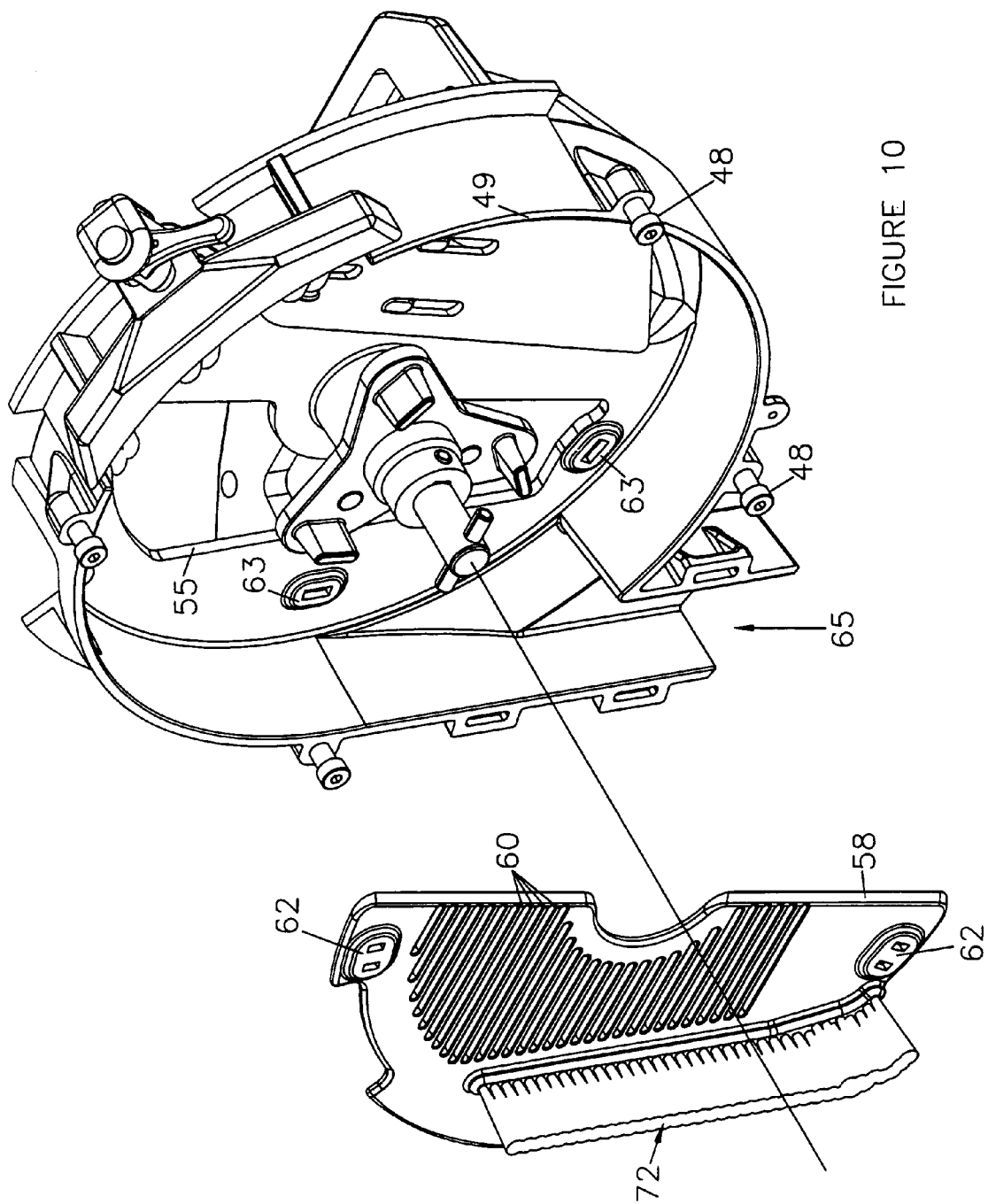
FIG. 10 is a view similar to FIG. 9 with the brush separator insert assembly in exploded relation.

Referring to FIGS. 4, 9 and 10, the meter housing 21 includes an upright back wall 46 which is circular and disc-like, and a cylindrical side wall 47 which extends toward the vacuum cover 22 and receives the cover for mounting by means of four mounting lugs 48 received in bosses 48A formed on side wall 47, and described further within. The back wall 46 includes a first opening 51 through which seed is admitted from the hopper for forming a reservoir of seed within the housing 21, bounded on the left (outer) side by the non-vacuum (or "reservoir") side 23A of disc 23.

Referring to FIGS. 4, 5, 9 and 10, an optional, adjustable plate 152 may be included to form a gate to adjust the seed inlet opening 51 from seed chute 69 to the seed reservoir. The plate 152 includes two parallel slots 156 which receive bosses 159, which guide the plate 152 in adjusting the seed inlet opening 51. A third slot 157 extends parallel to slots 156 and receives a thumb screw 150 which is threaded into the rear wall 46 of the meter housing to secure the plate 152 to the desired, adjusted position.

The rear wall 46 also includes an integrally mounted central boss or journal 53 into which the bearing 31 of the shaft 29 is pressed for mounting the drive hub 25. A second, larger opening 55 is formed in the back wall 46 of the housing. A plastic member referred to as an "insert", in the general form of a half disc, and generally designated 58 in FIG. 4, is located to cover the opening 55 in the back wall 46. The insert 58 is sized to be received within the housing 21; and the insert 58 is provided with a series of elongated, narrow, spaced slots generally designated 60 (FIG. 9) which extend laterally across the opening 55 in the rear wall of the meter housing 21. When the insert 58 is assembled to the housing 21 (by means of male and female connectors 62, 63 in FIG. 10), the slots 60 extend across the opening 55 and permit air to enter into the housing 21 so as to provide a uniform distribution of air at atmospheric pressure within the seed reservoir. Referring particularly to FIG. 9, the insert 58 is shown in its mounted position. The width of the slots 60 is small enough to prevent seeds from passing through. Different inserts, with different slot widths may be used for seeds of different size. The slots, together with air inlet apertures 52 in the disc 23 and an opening 54 extending partly in the side wall 47 and rear wall 46 of the housing 21, cooperate to establish uniform air pressure at atmospheric level substantially throughout the entire seed reservoir and the interior of the housing 21, including the point of seed release.

A seed singulator device 61, discussed further within, is mounted to the exterior of the side wall 47 near the top of the housing 21. The lower, forward portion of the side wall 47 of the housing 21 is formed to define three sides of a seed discharge spout 65. A discharge cover, seen at 66 in the lower left hand portion of FIG. 4 and assembled in FIG. 9, is secured to the discharge spout 65 to enclose the discharge area. Clips 67 of cover plate 66 are received in latches 68 formed in the housing 21 adjacent the discharge spout 65. A conventional seed tube (not seen in the drawing) is mounted below the discharge spout 65 for receiving and delivering seed to the open furrow, as is known in the art.

An inlet seed chute 69 is formed integrally with rear wall 46 and includes a mounting flange 70 for mounting the meter to the bottom of the seed hopper 16. Chute 69 funnels seed from the bottom of the hopper through seed inlet opening 51, sized by the adjustable gate 152 into the seed reservoir formed by the housing 21 and the seed disc 23. Insert 58 includes an integral bristle brush 72). The brush 72 forms a lateral wall defining the seed reservoir to prevent seeds from spilling directly into the discharge chute 65.

Turning now to FIGS. 3, 3A and 6–8, the vacuum cover 22 includes an outer shell or wall designated 73 has a generally toroidal form which is truncated or incomplete in the sense that the shell 73 extends circumferentially from a first end wall 74 to a second, opposing end wall 75. The opposing end walls 74, 75 are spaced to define an open sector generally designated 78 in FIG. 7 in which the vacuum cover does not extend, except for an axially extending continuation wall 83, to be described. Because the disc rotates counter clockwise in FIGS. 3 and 3A, the end wall 74 may be thought of as a beginning or starting wall, and the wall 75 may be termed a final or terminating end wall.

The shell 73 includes an upper wall 80, an outer side wall 81 and an inner side wall 82 which, together with end walls 74, 75, form an enclosure, except for vacuum coupling 92. Inner side wall 82 of the vacuum cover has a generally cylindrical form which continues between the starting end wall 74 and the terminating wall 75, forming the continuation section 83 which adds strength to the vacuum cover. Wall section 83 defines a raised portion or bridge 84 which permits debris to be discarded, as will be described. The corners of the shell 73 of the vacuum chamber may be beveled, as seen in the drawing, or curved or squared. Thus, the vacuum chamber 85A (FIG. 7) is in the form of a closed tunnel having a general C-shape or crescent shape when viewed from the left, extending from start wall 74 to the terminating end wall 75, and enclosed by the shell 73 which has a generally inverted U-shape in cross section (FIG. 20), with the distal ends of the legs of the "U" adjacent the disc 23. The outer and inner sidewalls 81, 82 of the vacuum cover may be generally cylindrical or frustoconical. However, their respective inner disc-engaging edges are circular with the centers spaced from one another. Thus, the cross-sectional area of the vacuum cover taken in a radial plane (relative to the center of the opening 85) increases progressively from the start wall 74 and the end wall 75 to the vacuum coupling 92. This has the effect of balancing or equalizing the pressure within the vacuum chamber at different circumferential locations about the circular arrangement of seed cells.

Figure 6:
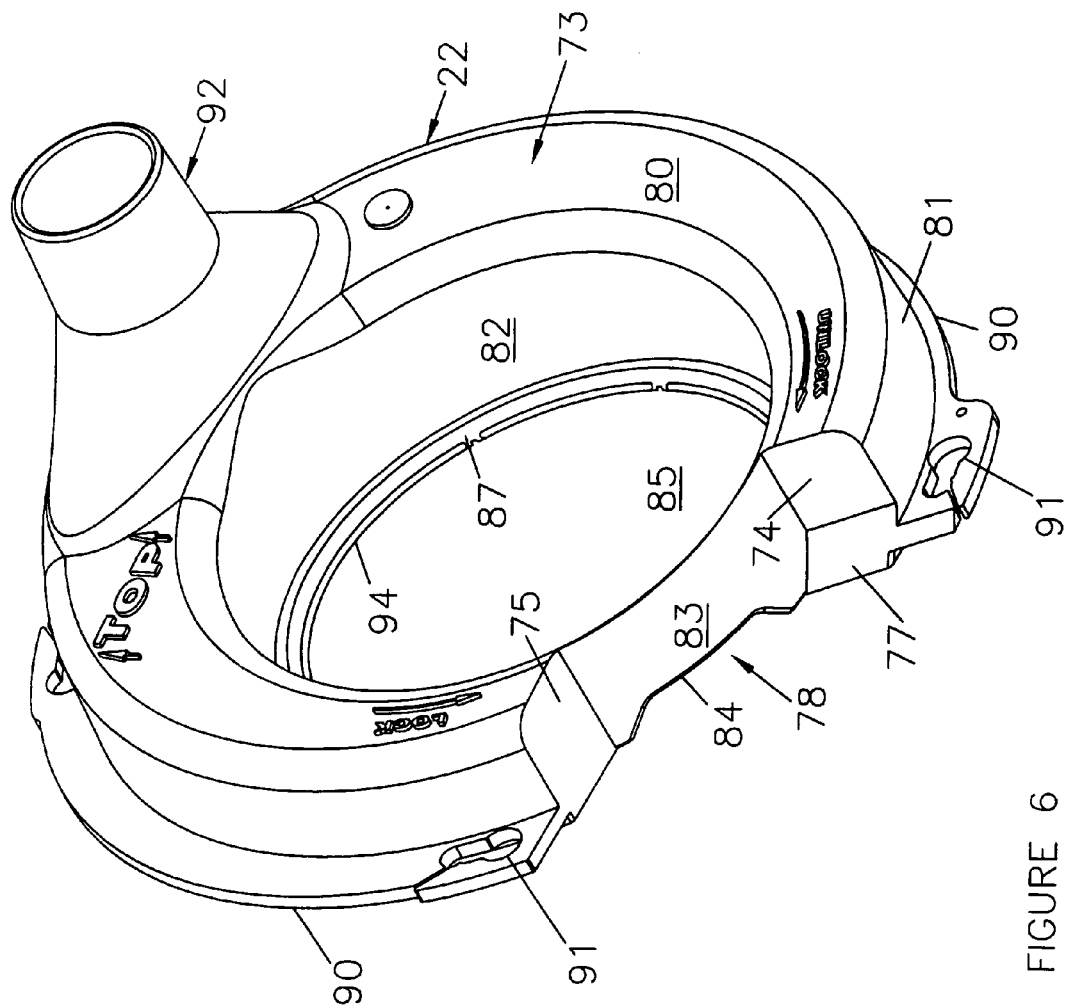
FIG. 6 is a lower, left side perspective view of the vacuum cover.
Figure 7:
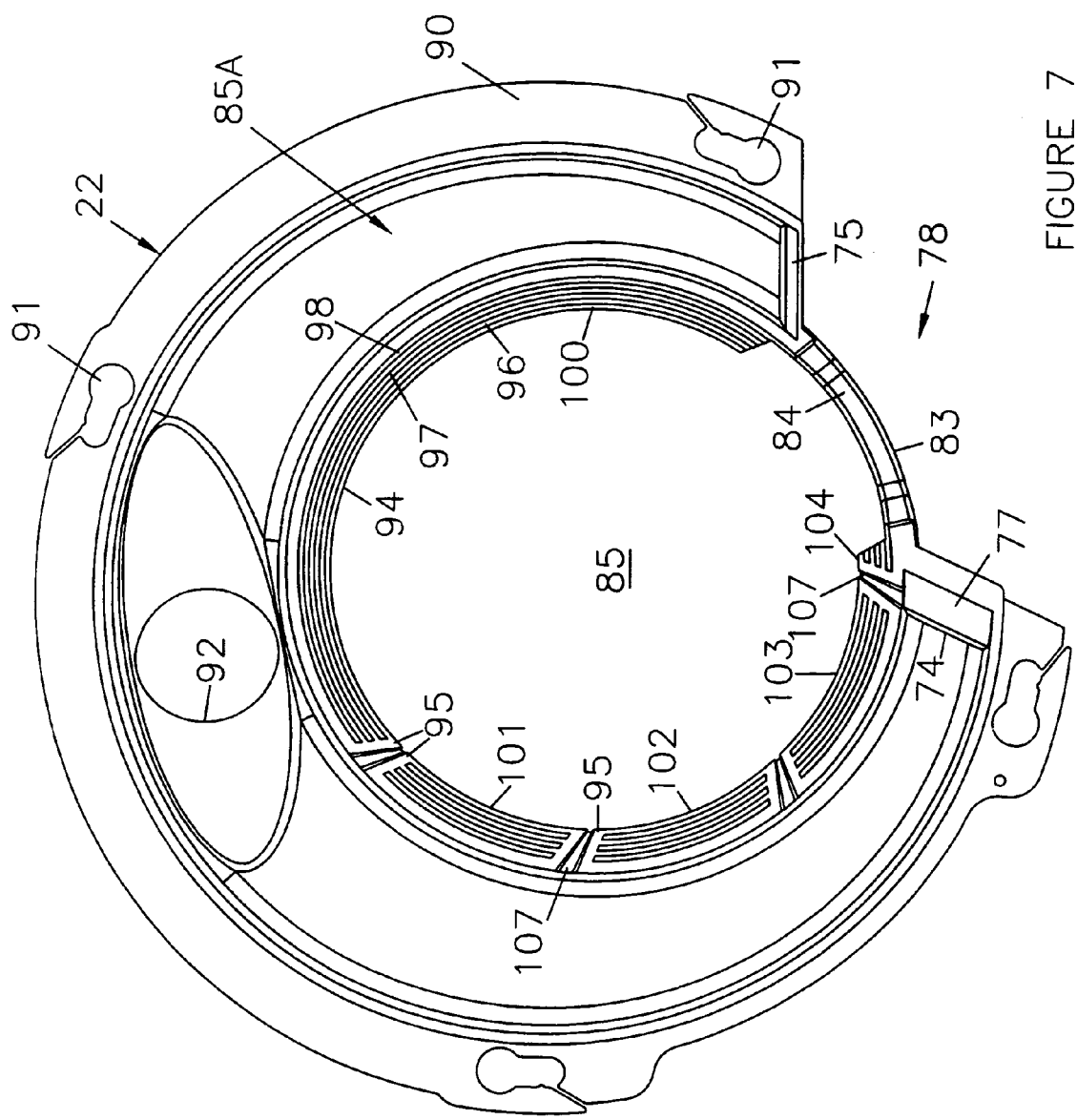
FIG. 7 is an interior elevational view of the vacuum cover of FIG. 6.
Figure 8:
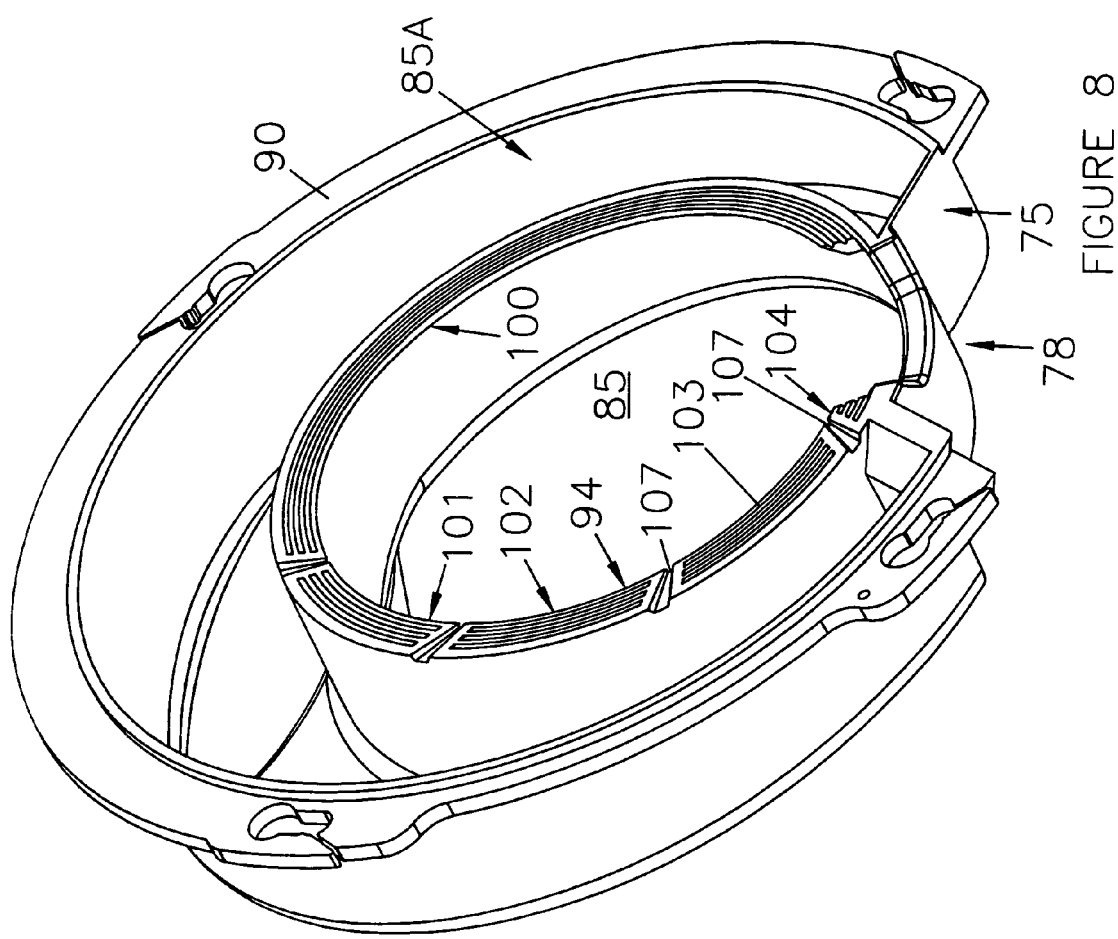
FIG. 8 is a lower, rear interior perspective view of the vacuum cover of FIG. 6.

The inner or central portion of the vacuum cover 22 is open—this area being designated 85 in FIGS. 6, 7 and 8. Thus, referring to FIGS. 3 and 3A, the adjacent or "vacuum" side of the disc 23 is open to the exterior may be seen and accessed through the opening 85 from the left or outer side of the meter. This is considered advantageous for a number of reasons. First, the center of the vacuum side 23B of the disc is readily available for visual inspection for wear or damage or for cleaning. The disc may be color-coded for different seeds, and the color is readily accessible by the farmer. Moreover, as will be discussed, the air flow into the vacuum chamber is able to be controlled and augmented so that there is a continuous flow of air through the vacuum chamber to evacuate fines and seed remnants, not only from within the vacuum chamber, but from the exposed portion of the disc 23 adjacent and within opening 85 formed by the inner wall 82 of the vacuum cover 22. Further, for discs of certain seeds, it may be desirable to include air inlet apertures such as those seen at 52 in FIGS. 3 and 4 in the central portion of the seed disc to 23 admit air into the seed housing 21 to augment air being introduced through the slots 60 of the insert and through opening 54 in the rear wall of housing 21, all of which cooperate to equalize the interior pressure of the seed reservoir to atmospheric pressure.

Referring primarily to FIG. 6, it will be recalled that the disc 23 rotates in a counter-clockwise direction relative to the vacuum cover 22 when viewed from the exterior. A seed cell or aperture enters the vacuum chamber beneath the start end wall 74 of the cover 22 and rotates counter-clockwise. The vacuum promotes seed placement in a seed cell (to be described), and the disc continues to rotate past the second or terminating end wall 75 where the disc then exits the vacuum chamber (see seed orifice 79 in FIG. 3A) and re-enters the atmosphere in the open or uncovered sector 78 between the opposing walls 74, 75. It will be appreciated that when a seed orifice, such as the one designated 79 in FIG. 3A passes beneath the terminating end wall 75 of the vacuum chamber, atmospheric pressure is immediately applied to the vacuum side of a seed cell, i.e. across the disc, and the seed is released into the discharge spout 65 with a reliable and repeatable action, thus improving the accuracy of seed spacing.

Returning to FIG. 6, it will be observed that the start end wall 74 of the vacuum chamber, is provided with an inclined section designated 77, the lower edge of which engages the vacuum side of the disc (which rotates counterclockwise as seen in FIG. 6). The inclined wall section 77 acts as a scraper to remove debris from the portion of the disc passing into the vacuum chamber, and directs that debris downwardly through the open sector 78 of the vacuum cover 22, where the debris falls from the meter unobstructed An inner, lower edge of the inner side wall 82 of the vacuum cover 22 is provided with a formed, beveled surface 87 which tapers inwardly toward the disc 23 and toward the center of the central opening 85 of the vacuum cover 23. This beveled surface 87 provides an inclined, circumferentially curved surface to clear and clean the adjacent outer surface of the disc (which is the vacuum side) of any foreign matter by scraping. Materials which are thus loosened and removed from the vacuum side 23B of the disc 23 also fall freely downwardly through the raised portion 84 of the continuation wall 83 of the cover through the open sector 78 of the housing 21.

A peripheral mounting flange 90 is formed at the base of the outer side wall 81 of the vacuum cover 22. The outer flange 90 is not continuous about the vacuum cover in order to leave the open sector 78 free of obstruction. The mounting flange 90 defines a series of keyhole slots such as those designated 91 for fitting over and coupling with associated mounting studs or lugs 48 (FIG. 5) secured in bosses 48A formed on the sidewall 47 of the housing 21. The studs 48 have enlarged heads (see 50 in FIG. 3A). To assemble the cover 22 to the housing 21, the flange 90 of the cover is placed against the edge 49 of the housing, with the studs 48 aligned with associated slots 91, and with the heads 50 received in the larger aperture of an associated keyhole slot 91. The cover is then rotated counterclockwise (in the direction of disc rotation) until the base of the studs enter the narrow portion of the keyhole slot (see FIG. 6), thereby locking the cover to the housing. A manual clockwise rotation of the cover unlocks it from the housing and permits removal of the cover without the need for power assist or any tools whatever.

The upper, central portion of the top wall 80 of the cover 22 is formed into a coupling 92 to receive a hose or conduit connected between the vacuum cover 22 and the source of suction, which typically is a fan driven by a hydraulic motor, in the case of a planter.

Referring now to FIGS. 7 and 8, the under or marginal surface 95 of the beveled flange 87 of the inner wall 82 of the vacuum cover 22 is a flat surface which engages the adjacent surface of the disc 23 and remains in contact with that surface in a manner such that the radial inner edge 94 of the beveled flange 87 brushes or scrapes away debris from the part of the vacuum surface of the disc 23 which it engages. The center of the central opening 85 of the cover 22 is offset from the center or axis of rotation of the disc. In the illustrated embodiment, the center of the central opening 85 is below the axis of rotation of the disc 23. By this arrangement, the inner marginal or contact surface 95 of the cover which contacts the disc does not form a narrow contact band and corresponding narrow wear pattern as would occur if the center of the central opening 85 of the vacuum cover 22 were located on or near the axis of rotation of the disc. Rather, due to the eccentric location of the opening 85 relative to the axis of rotation of the disc, the wear pattern broadens out beyond the thickness of the contact surface 95 adjacent the inner beveled edge 94 as the disc rotates, thus broadening the contact region and reducing the wear on any one given region of the disc which contacts the inner marginal surface of the cover.

The marginal surface 95 the beveled flange 87 can be seen to be comprised of a series of segments separated by radial slots 107. The marginal surface 95 is divided into five sectors or sections in the illustrated embodiment, designated respectively 100, 101, 102, 103 and 104 in FIG. 7. Each segment 100–104 has a set of three circumferential grooves 96, 97, 98; and the sectors are divided by a series of radially outwardly extending slots designated 107. The radial slots 107 have, as seen in FIG. 7, an increasing width (and cross sectional area) proceeding away from the center of the central opening 85. The axis of each slot 107 is inclined slightly away from a direct radial line and toward the direction of rotation of the disc (clockwise in FIG. 7). This promotes the flow of debris into the vacuum chamber.

The purpose of the arrangement of radial slots 107 and sealing segments 100–104 is to create an air dam or barrier between the cover and the disc so that air from the central opening 85 flows between the individual segments 100, 101, 102, 103 and 104 of the air dam, through slots 107 in a controlled and continuous manner, suctioning into the vacuum chamber, as the disc rotates, any fines or other debris capable of passing through the slots 107 and into the vacuum chamber 85A where these materials are then evacuated by passing through coupling 92 and ultimately expelled by the vacuum fan.

The inner surface of the vacuum housing is made rough or textured by conventional means, so as to reduce any tendency to have seed treatments or powder adhere to it. Discs of different thickness may be used without modification of the rest of the structure, as will be described.

Turning now to FIGS. 11–16, the seed disc 23 is seen to comprise a series of circumferentially located seed cells, generally designated 110. The seed cells 110 are, in the illustrated embodiment, spaced about and immediately adjacent to the periphery of the seed disc 23. As will be further described within, it is considered an important feature of the present invention that the seeds are delivered, at the point of release, directly tangentially outwardly of the disc, rather than having an axial (that is, downward and to the left in FIG. 11) component of motion. As explained above, such an axial component of motion is likely to lead to ricocheting of the seeds off the walls of the discharge chute, thereby adding uncertainty as to the flight time of the seed from the point of release to the location of lodging in the base of the formed furrow, and rendering the spacing of seeds non-uniform.

Figure 11:
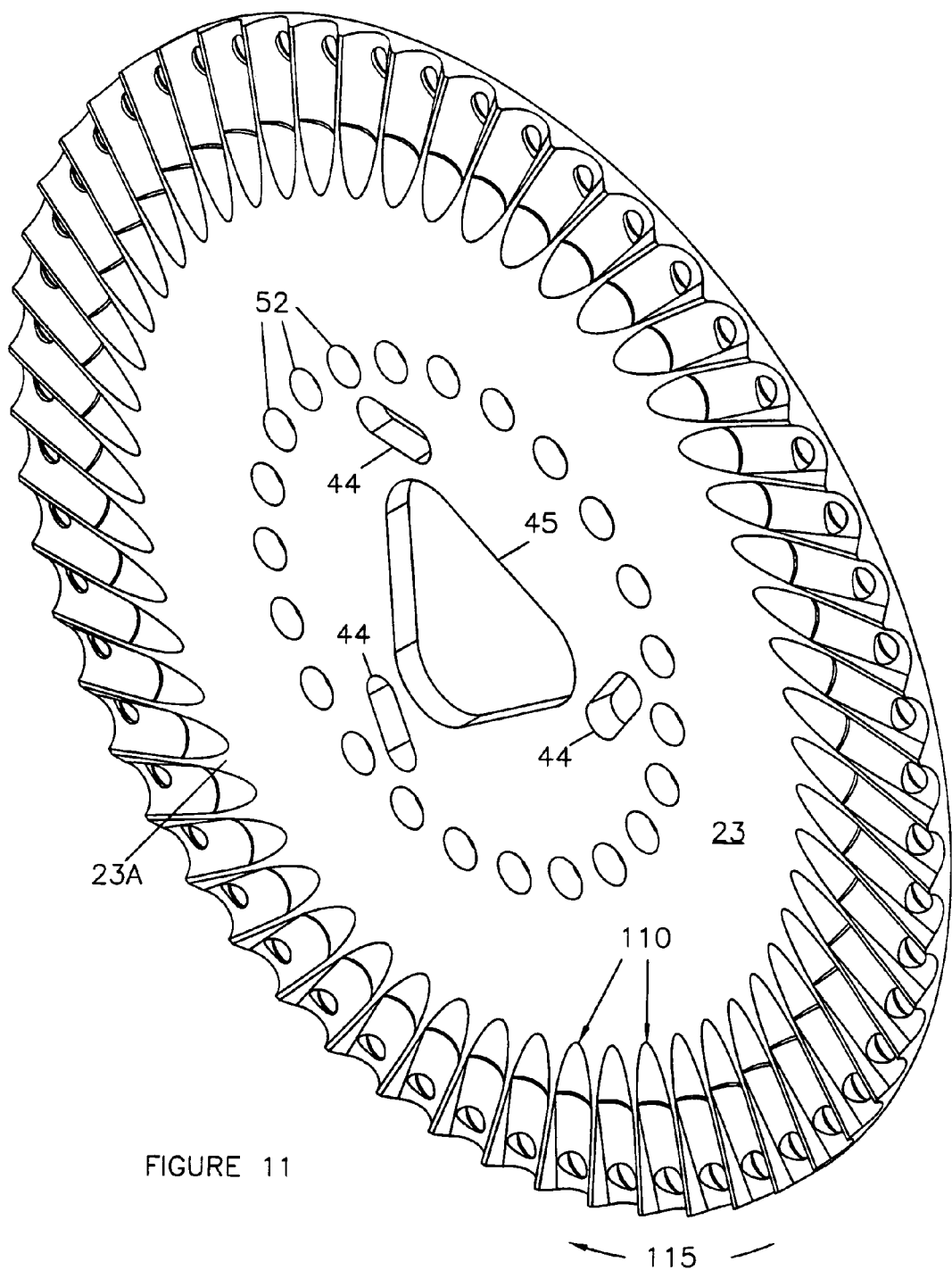
FIG. 11 is a perspective view of an alternate seed disc of the meter of FIG. 3, showing the reservoir side of the disc.

As seen in FIG. 11, the disc 23 (which may be used for peanuts, for example) rotates in the direction of the arrow 115, hence, the side of the disc 23 seen in FIG. 11 is the reservoir side 23A of the disc 23, whereas the vacuum side of the disc is seen, for example, in FIG. 3A. The outer edge of the disc may be tapered or beveled, as seen best at 116 in FIG. 13.

Figure 12:
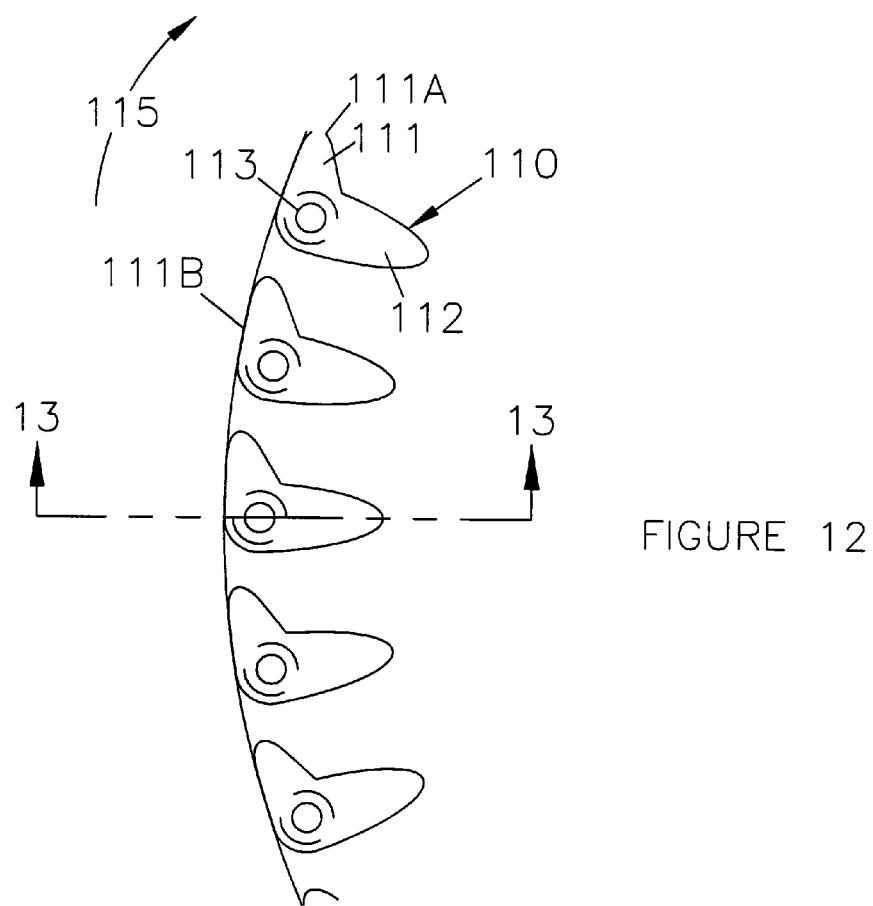
FIG. 12 is an enlarged, fragmentary elevational view of a section of the periphery of one seed disc of FIG. 3A showing the seed cells.
Figure 13:
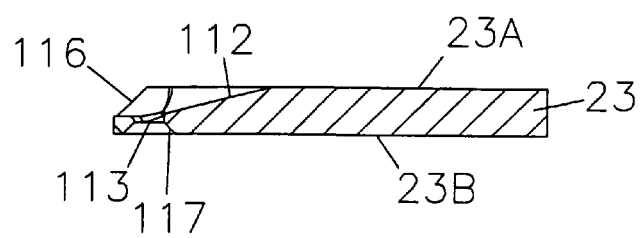
FIG. 13 is an enlarged, transverse cross-sectional view of a peripheral segment of a seed disc taken through the sight line 13—13 of FIG. 12.

Referring particularly now to FIGS. 12 and 13, There is shown a disc which may be used for corn seed. Each of the seed cells 110 includes a circumferential recess 111 and a radial recess 112 in communication with a seed orifice 113 which communicates the vacuum to a seed seated in a cell. The circumferential recess 111 is thus extended or directed in the direction of rotation. In other words, if a seed is located adjacent the outer perimeter of the disc 23, it will first encounter the circumferential recess 111. The function of the circumferential recess 111, which deepens or is progressively recessed from the leading edge 111A toward the seed orifice 113, is to promote the travel of a seed toward the lower portion of the seed cell and the adjacent opening of the seed orifice 113. As seen in FIG. 12, the seed orifice 113 extends from the base of the seed cell down to the vacuum side of the disc, designated 23B in FIG. 13. The lower portion of the seed orifice 113 is chamfered as at 117.

As best seen in FIG. 12, the outermost, peripheral portion of the circumferential seed recess 111, designated 111B, is open and leads into the chamfer 116. Thus, when a seed is released from the cell, it is free to move tangentially outwardly immediately (as can be appreciated from FIG. 13), unobstructed by any portion of the disc, under both centrifugal force and gravity, because the seed is released at a location of approximately 8:00 o'clock when viewing the vacuum chamber, and considering the location of the terminating end wall 75 of the vacuum cover.

The radial recess 112 of each seed cell facilitates the dislodgement or separation of duplicate seeds—that is, the purpose of each seed cell is to allow the singulator to isolate and secure (i.e. "singulate") a single seed in each cell.

Figure 14:
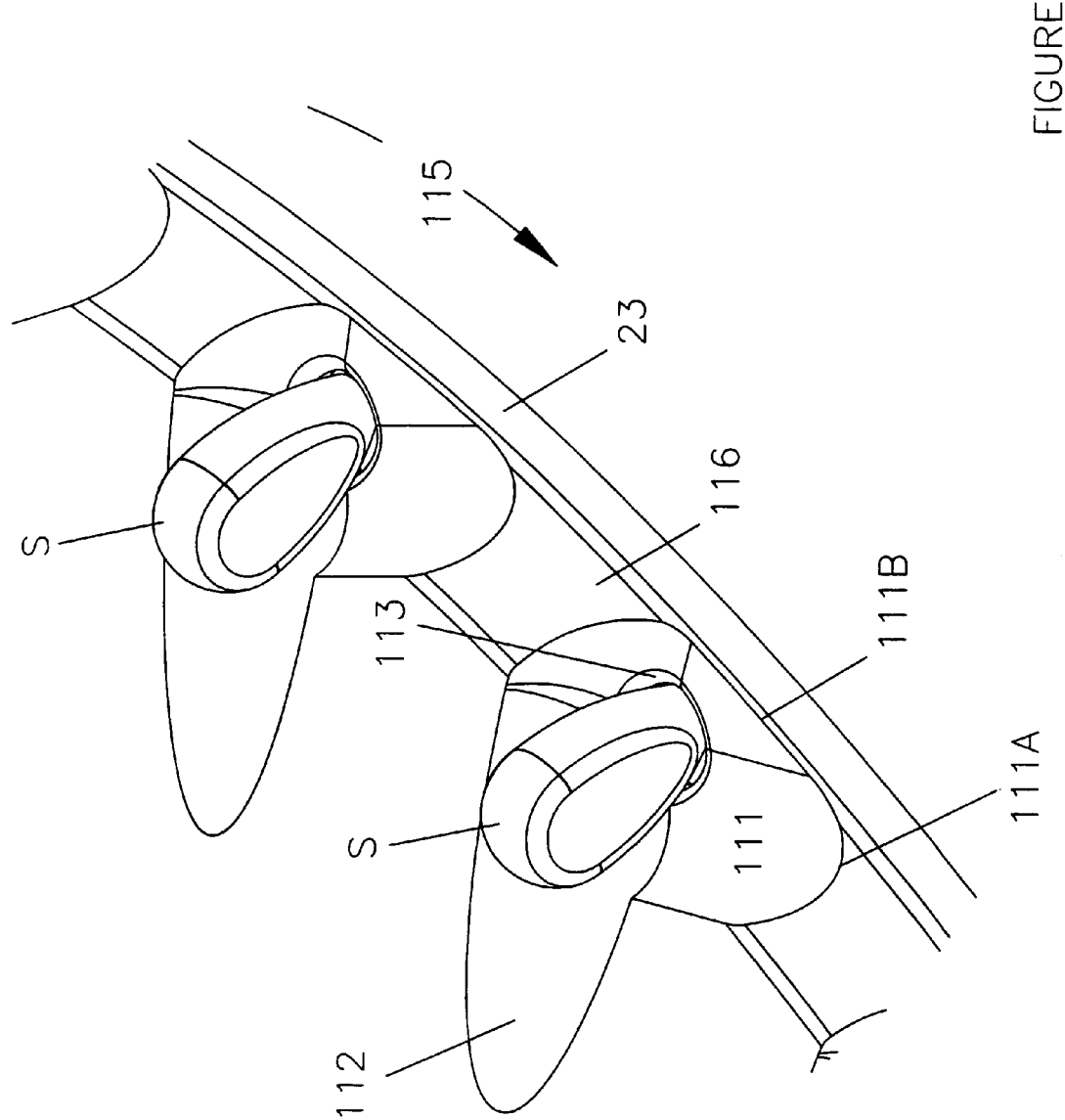
FIG. 14 is an enlarged, fragmentary, perspective view of the periphery of the seed disc of FIG. 12 showing seeds seated in adjacent seed cells.

Referring now to FIG. 14, a close up view of adjacent seed cells is seen, individual seeds designated S are received in, and secured by means of the vacuum to the disc via the seed orifice 113.

Turning now to FIGS. 4, 5, 15 and 16, the singulator device 61 will be described. The singulator includes a holder 119 which may be of a synthetic or plastic material. Three sets of brush bristles designated 120, 121 and 122 are carried by and secured to the holder 119. Each set of bristles comprises a brush, and they all may be similar, so that only one need be described. The brush 120, which is the leading brush set includes first and second sets of bristles or "tufts" 123, 124 (FIG. 5A) which extend or are inclined downstream in the direction of rotation 115 relative to a radial line.

Figure 4A:
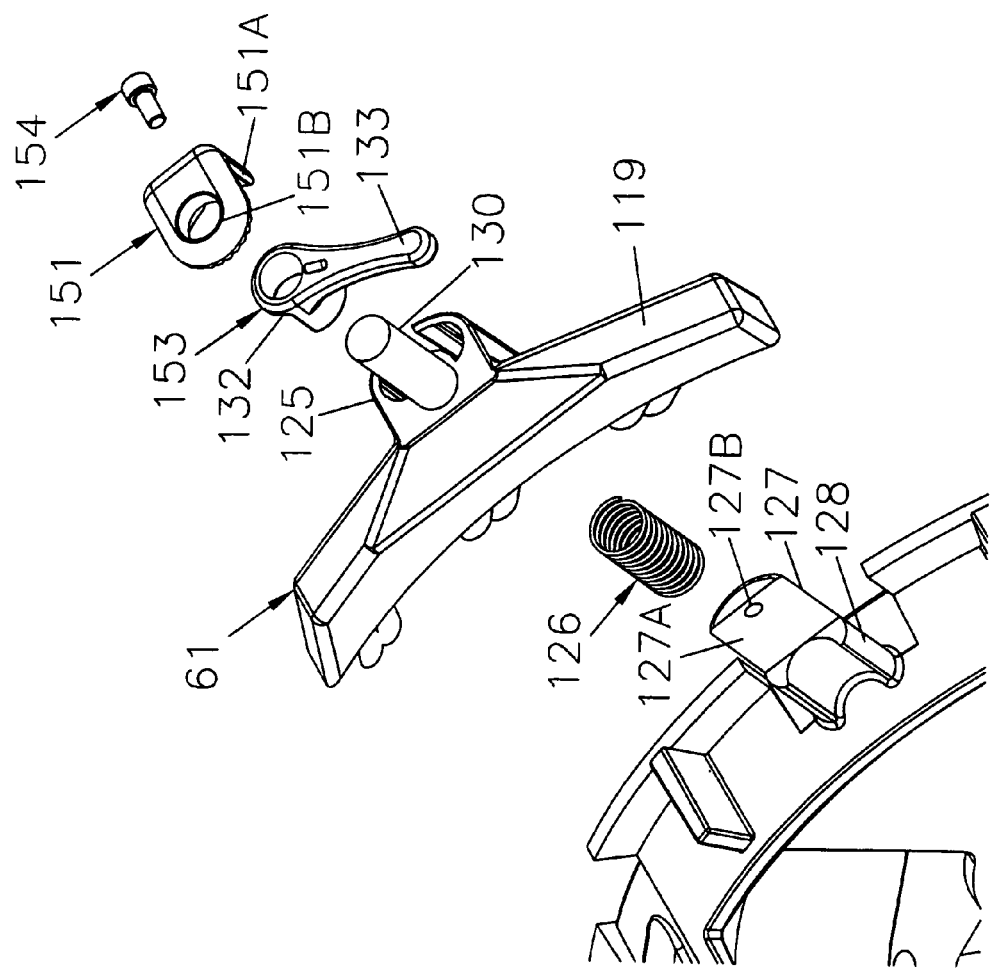
FIG. 4A is a fragmentary close-up perspective view of the seed singulator of the meter, with the components in exploded relation.
Figure 5A:
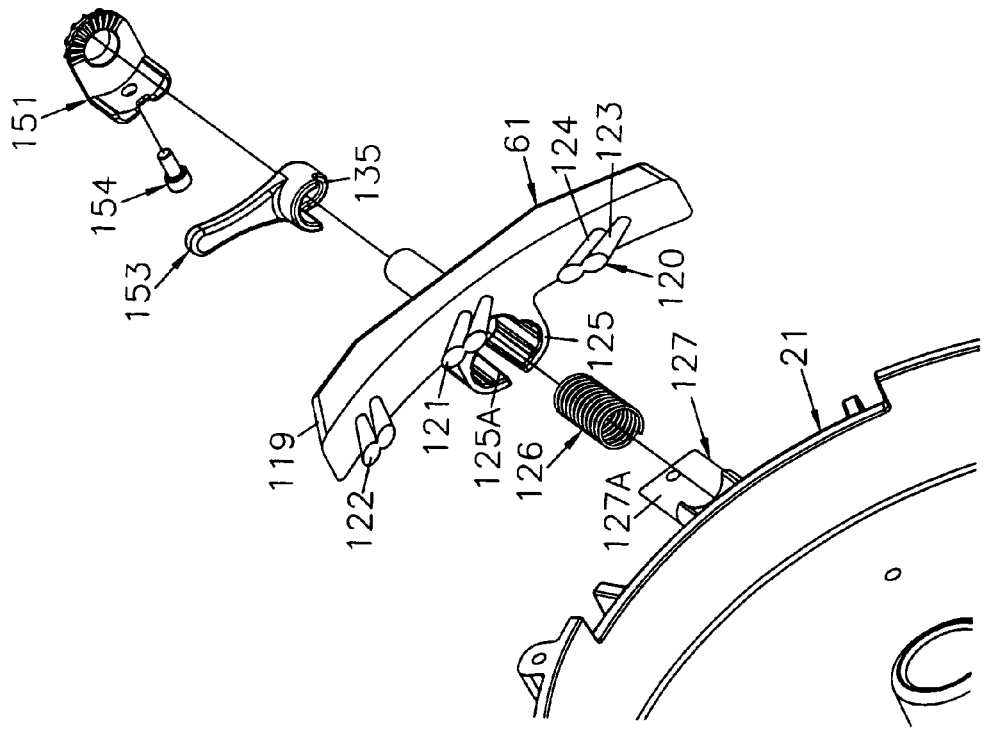
FIG. 5A is a lower perspective view of the singulator with components in exploded relation.

Turning now to FIGS. 4A and 5A in particular, the rear of the brush holder 119 is provided with a generally cylindrical extension 125 which defined a radial opening 125A which receives a spring 126. The extension 125 is received on and secured to a bracket 127 fixed to the outer surface of side wall 47 of the housing 21. The bracket 127 includes a lower semi-cylindrical seat 128 for spring 125, and an upright back 127A defining an aperture 127B. The upper end of spring 126 bears against the bottom of brush holder 119 and urges it radial away from the central axis of rotation. A shaft or pin 130 extends radially of the brush holder 119 and rotatably receives an adjusting lever 153 which is held in place by a cap 151 having a flange 151A which include an aperture 151B which receives the shaft 130 of the brush holder. The flange 151A of cap 151 extends through the opening 125A of bracket 127. A cap screw 154 is placed through an aperture in the flange 151A and aperture 127B of bracket 127 to hold the adjusting assembly in place and maintain the spring 126 in compression for the entire adjustment range.

Figure 15:
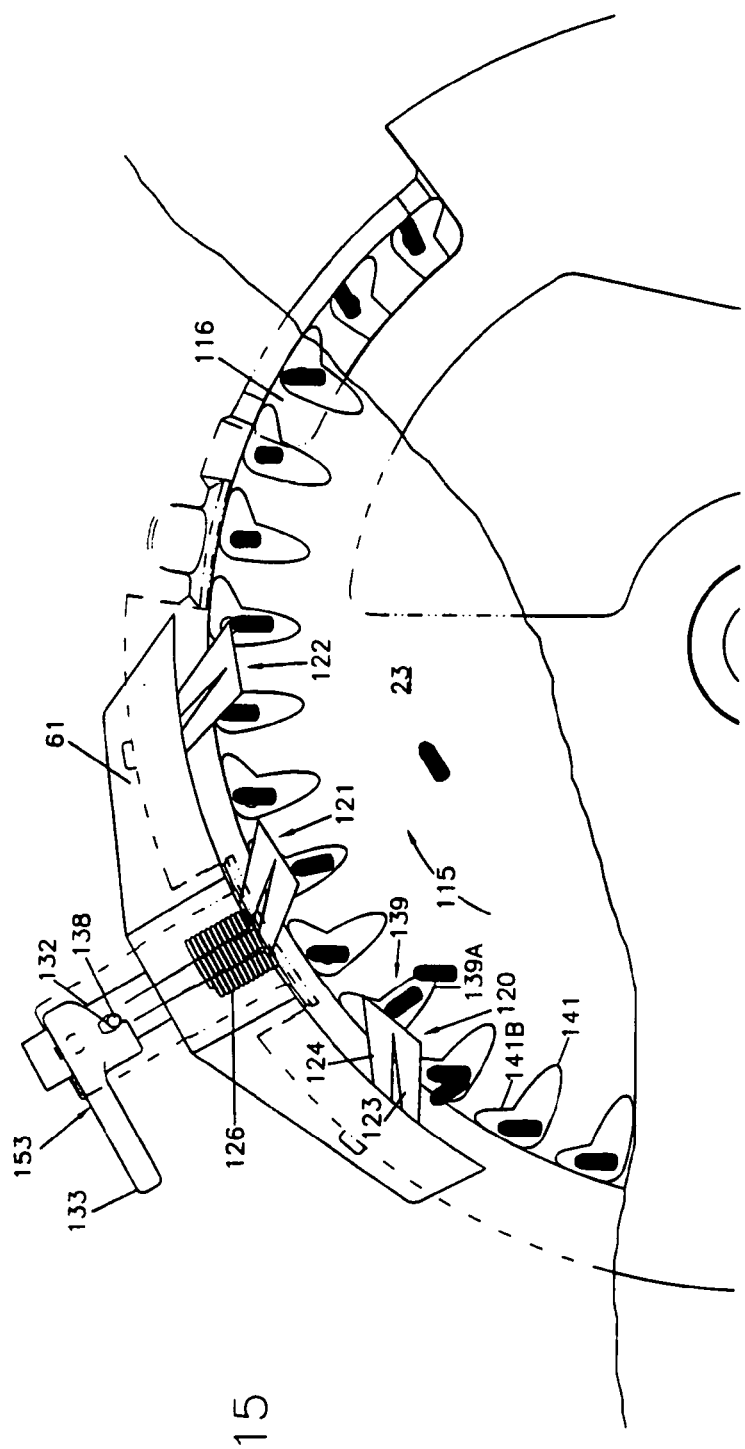
FIG. 15 is a side view of a portion of a seed disc and the singulator mechanism in operative relation.

The brush holder 119 is assembled to the bracket 127 by having the bracket placed in the opening 125A of the rear extension 125 of the brush holder. The extension 125 is shaped to receive and engage the edges of the seat 128. This permits the brush holder 119 to slide in a radial direction relative to the axis of rotation of the disc, but restraining axial, circumferential or rotational motion of the brush holder. It also facilitates brush replacement. Turning to FIGS. 4A, 5A and 15, the brush holder 119 is held in a predetermined radial position against the bias of the spring 126 by means of adjusting lever 153 which is rotatably received on pin 130 and includes a cam surface 135 (FIG. 5) which extends in a generally helical path about the axis of the pin 130. The outer limit position of the adjusting lever 153 is fixed by the cap 151, which allows the lever 153 to rotate. Spring 126 exerts a radial outward force against the brush holder 119 and lever 153. A pin 138 is fixed in the radial shaft 130 (FIG. 15) and extends beneath the cap 151.

Figure 16:
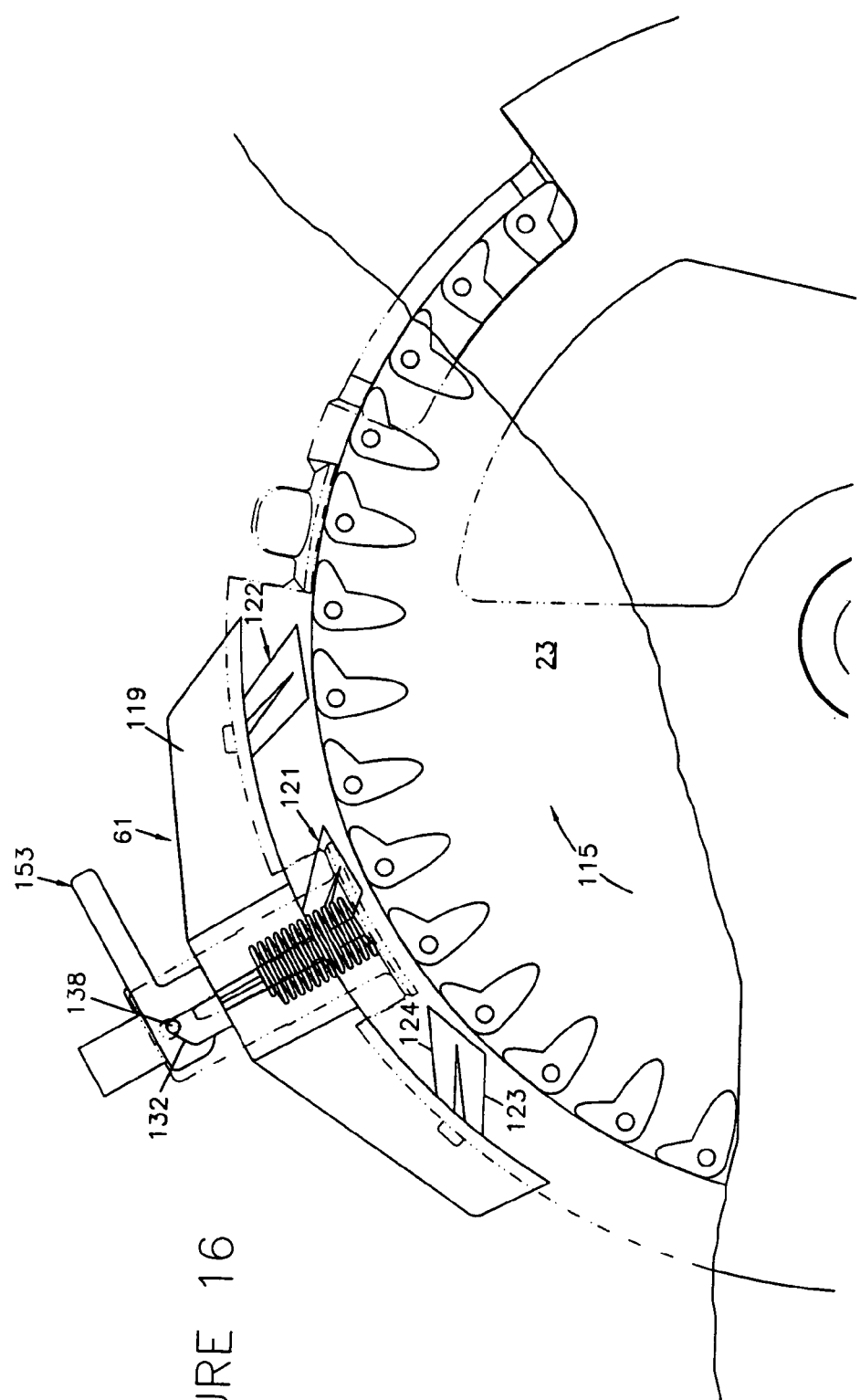
FIG. 16 is a view similar to FIG. 15, with the singulator adjusted to a location further from the seed retention opening.

As the handle 133 of lever 153 is rotated clockwise (looking radially toward the axis of rotation), the portion of cam surface 133 furthest from the axis of disc rotation engages the pin 138, thus enabling the spring to raise the brush holder and brushes to a raised position as seen in FIG. 16. As the lever 153 is rotated counterclockwise, pin 138 engages the portion of cam surface 132 closest to the axis of rotation, thus lowering the brushes to the position of FIG. 15.

It will be appreciated that the brushes are guided into the reservoir side 23A of the disc 23 and retained in that position without straddling the edge of the disc due to the bevel 116 at the edge of the disc. In other words, the beveled edge 116 insures that the bristles of the brushes 120–122 will be on the reservoir side of the disc 23 for various levels of adjustment, as seen in FIG. 16, where the brushes are located such that their distal ends are adjacent the periphery of the disc, to that of FIG. 15 wherein the brushes are more deeply set and the ends of the brushes are radially inward of the seed orifices.

Still referring to FIG. 15, on the left side of the disc 23 there are seed cells emerging from the seed reservoir, some of which have a single seated seed, but others of which have duplicate seeds. As a seed cell bearing a duplicate, such as the cell generally designated 139 in FIG. 15 encounters the first brush set 120, it can be seen that one of the seeds is dislodged and the other seed may be moved slightly from the seed orifice. The upper seed, however, is returned to the seed orifice due to the suction of the vacuum when the seed passes the brush set 120, captured by the radial recess of the cell. That is, during this movement, the seed rests in the radial recess 139A of the seed cell 130. It has been found that the use of a single brush does not consistently and reliably eliminate all duplicates. A second brush (the two tufts are considered as one brush) downstream of the first, such as the one designated 121, removes further duplicates not corrected by the first brush, but again, the second brush set does not eliminate all of the duplicates as desired. It has been found that by using three brushes (with each brush along the direction of disc motion extending further inward) in sequence and as illustrated in FIG. 15, singulation is performed reliably and repeatedly so that substantially all of the seed cells have one seed but not duplicates.

Figure 17:
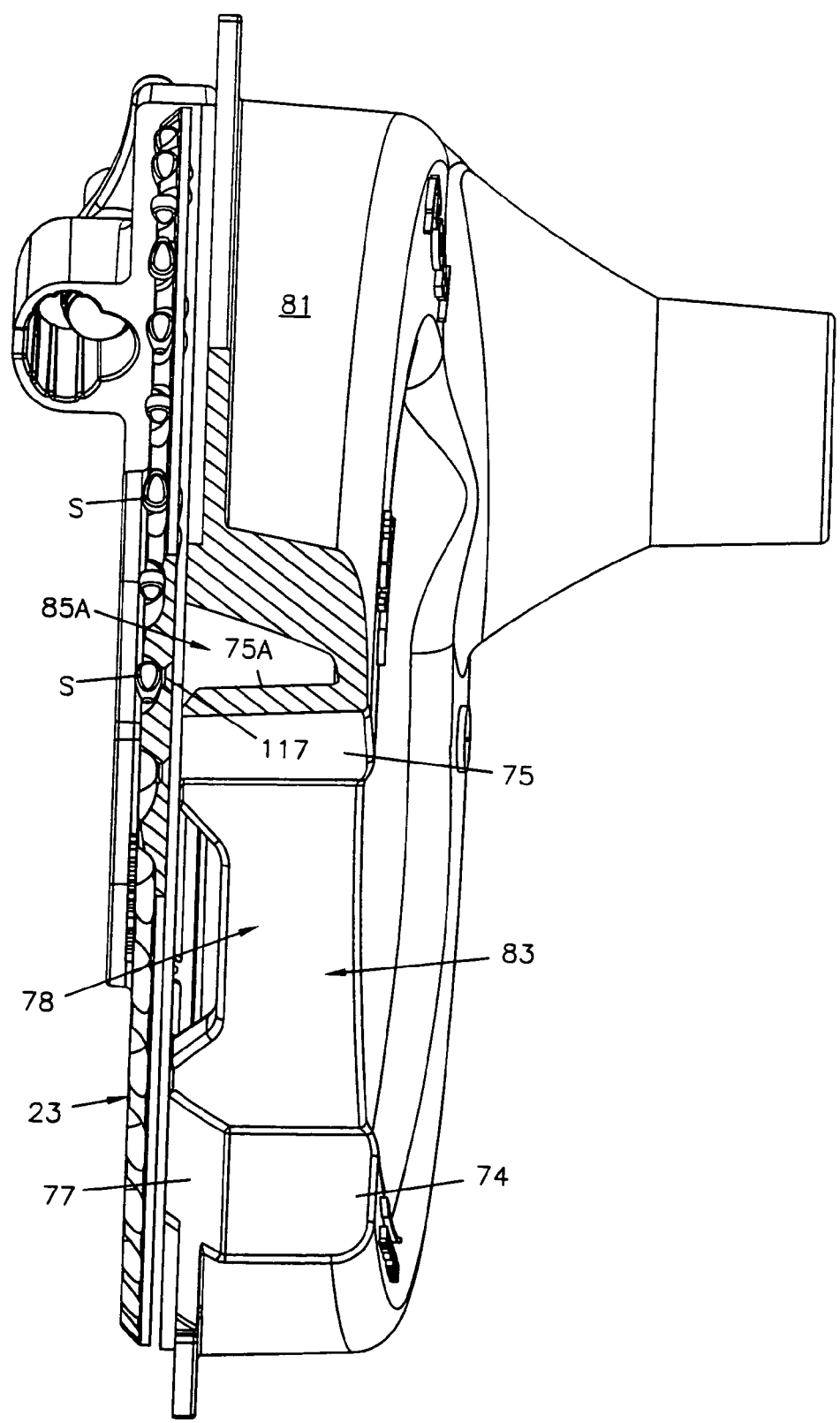
FIG. 17 is a side view of the vacuum cover and seed disc with a portion of the structure sectioned along the sight line 17—17 of FIG. 17A.
Figure 17A:
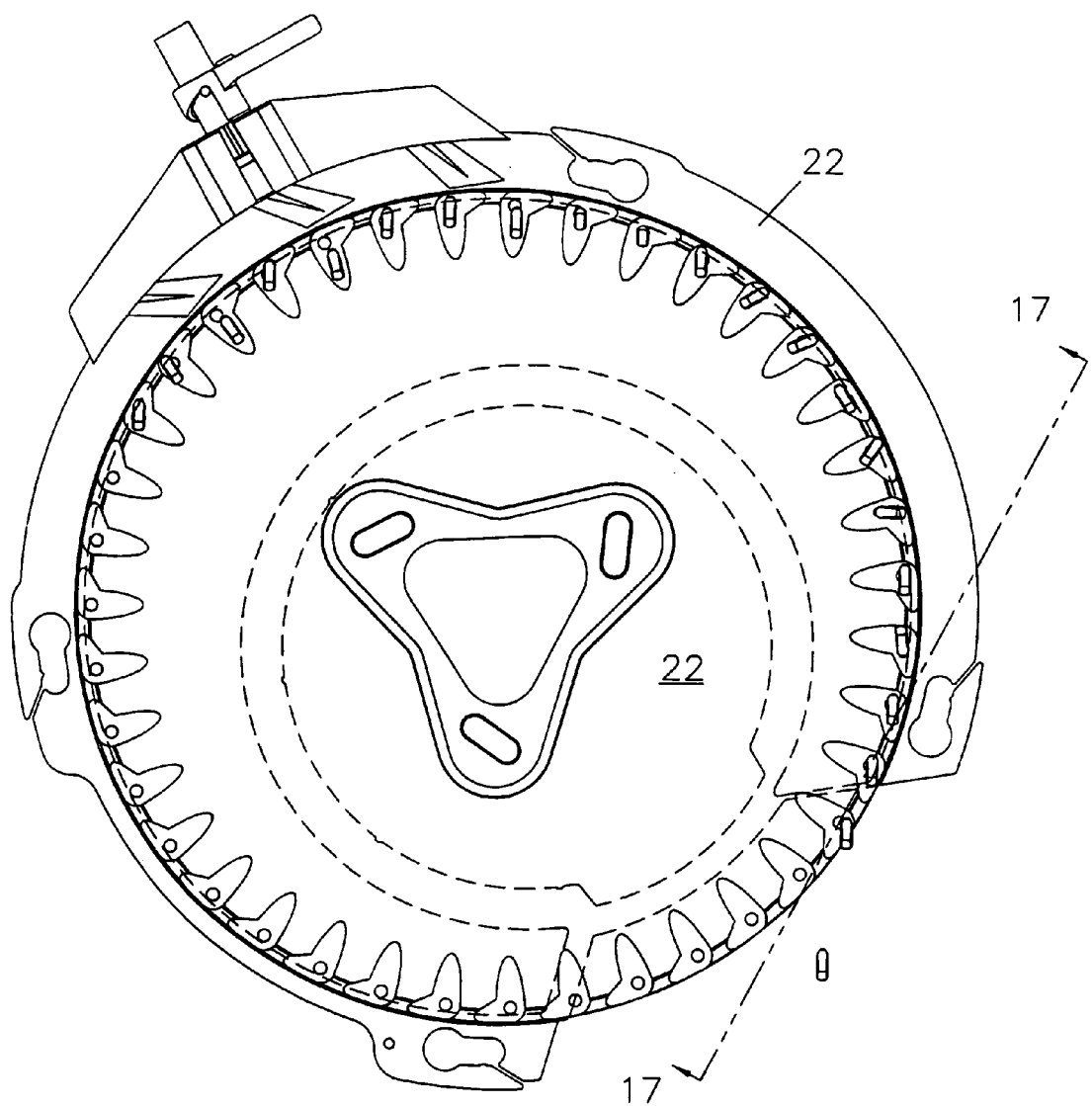
FIG. 17A is a side elevational view of the reservoir side of the seed disc and vacuum cover in assembled relation.

Turning now to FIGS. 3A and 17–19, the release of the seeds for delivery to the furrow will now be discussed. Turning first to FIG. 17, the disc 23 is rotating with the near side of the disc in a downward direction. The cross section of the vacuum cover in FIG. 17 is at an angle relative to the end wall 75 as seen from FIG. 17A. It will be observed that prior to passing beneath the end wall 75 (see also FIG. 18), the seed cells are carrying single seeds. The seed immediately adjacent the end wall 75 is designated S in FIGS. 17 and 18. The interior of the vacuum chamber, 85A extends right up to the interior surface 75A of the end wall 75, maintaining the seed S secured to the disc 23 by means of the vacuum being communicated to the seed through the seed orifice, as discussed above.

However, as soon as the seed cell passes beneath the end wall 75 (see seed position S1 in FIG. 18), the vacuum is removed from the vacuum side 23B of the disc 23 as seen in FIG. 17. In other words, the seed cell passes immediately into the open sector 78 defined as the angular position between the start end wall 74 and the terminal end wall 75 of the vacuum chamber and adjacent (but radially outward of) the continuation 83 of the inner wall 82 of the vacuum housing. It will be observed that both sides of the disc are fully exposed to the atmosphere once a seed cell passes beneath the end wall 75, as further illustrated at 79 in FIGS. 3A and 19 and discussed above. As a result, the release of the seed is immediate because the retaining vacuum no longer retains the seed once it passes beyond terminating end wall 75.

The openings 54 and 55 in the seed housing and openings 52 in the disc all cooperate to equalize the pressure within the seed reservoir. This produces a more uniform differential pressure retaining individual seeds on the disc and reduces or eliminates any "chimney" effect in the discharge chute.

Figure 18:
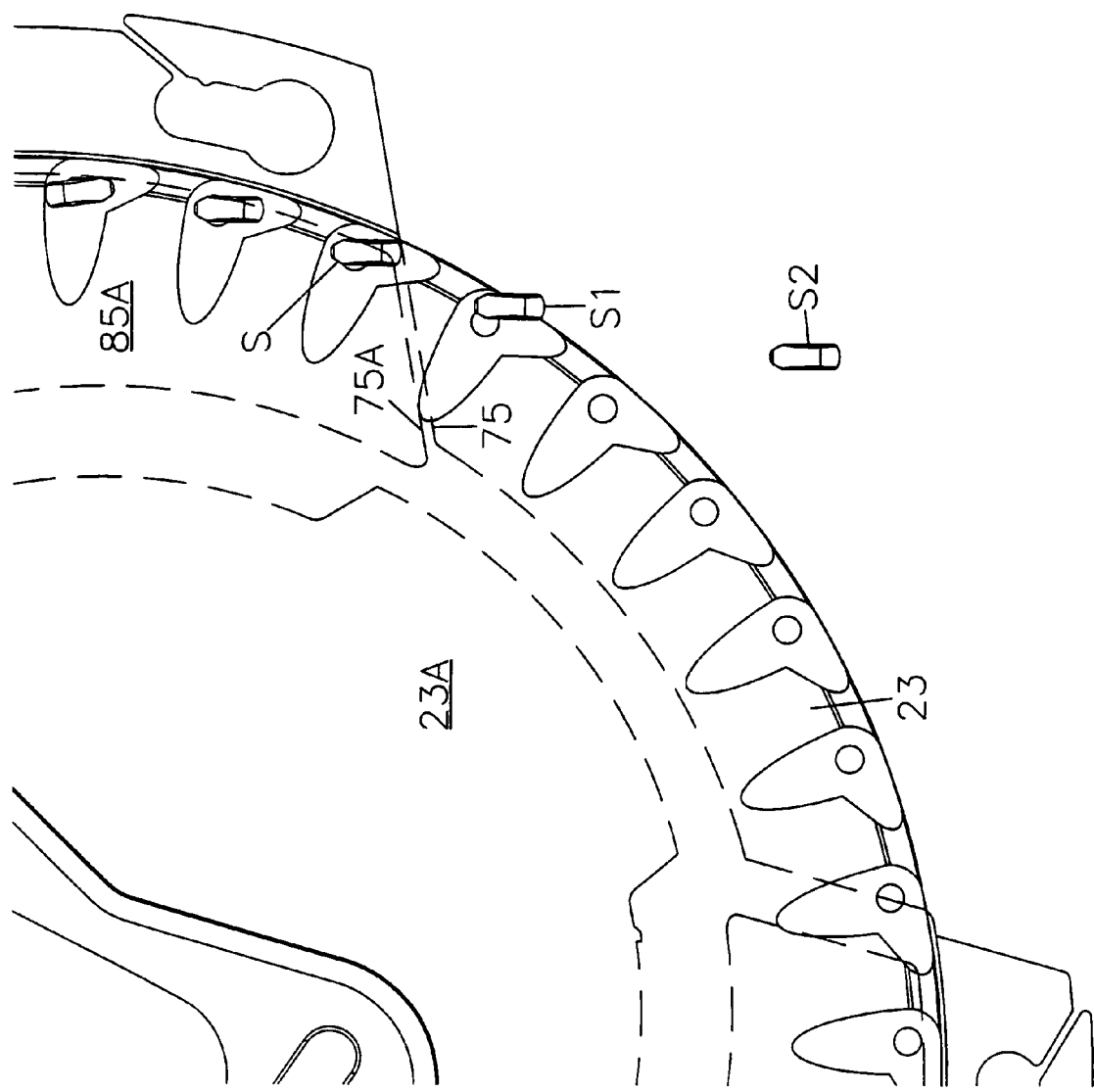
FIG. 18 is an elevational side view of a portion of the seed disc of FIG. 3 adjacent the release point of the seeds and showing the seed discharge for an idealized release.
Figure 19:
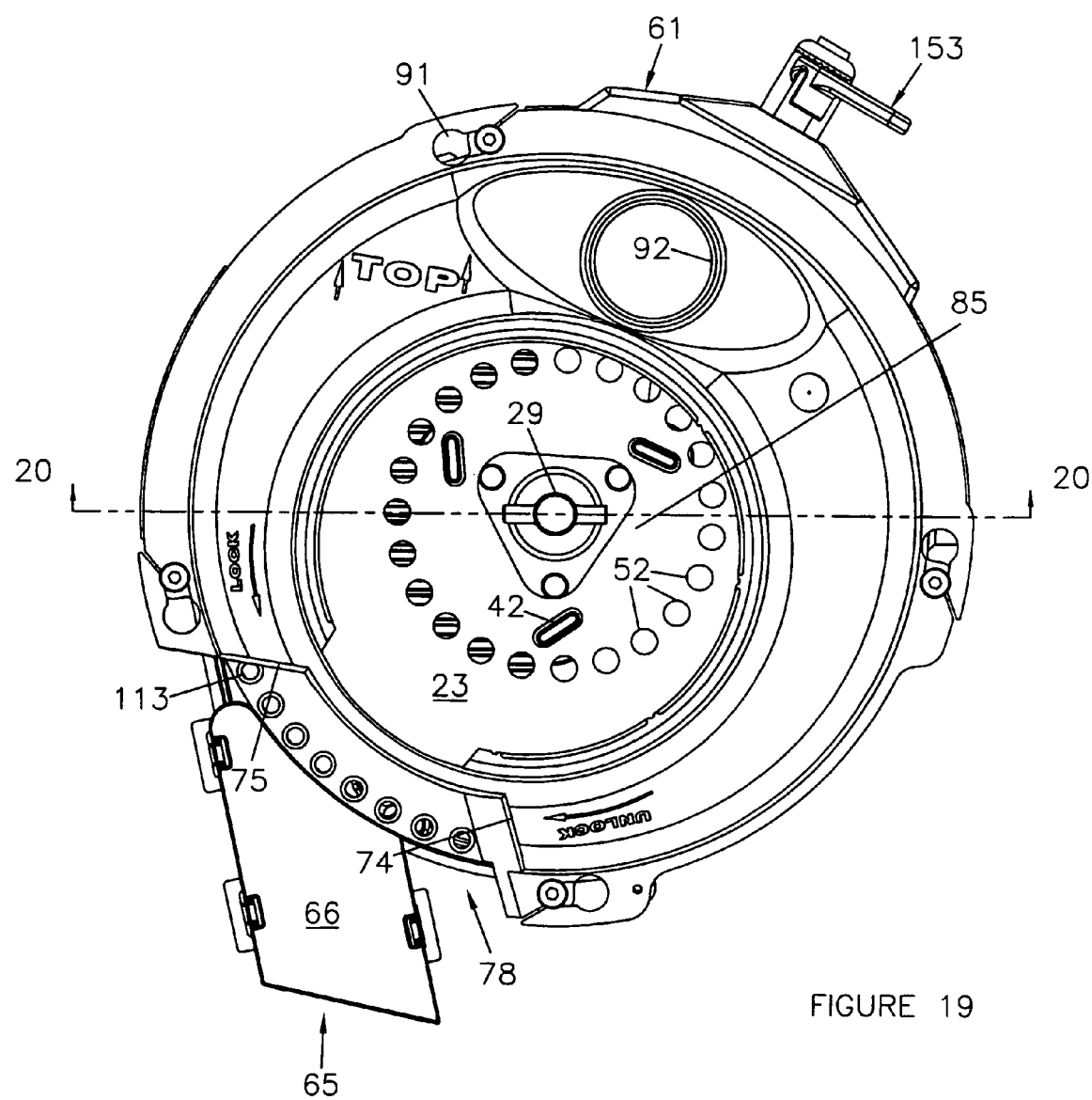
FIG. 19 is a left side elevational view of the air seed meter of FIG. 1.

Moreover, as illustrated in FIG. 18, which is a view taken from the reservoir side 23A of the seed disc 23, once the seed cell passes to the atmosphere side of the terminating end wall 75 of the vacuum housing, the seed cell moves to the left as it continues rotating, but the seed itself, such as that designated S1 in FIG. 18 is free to fall. Moreover, it is unencumbered by any lateral wall or rise in the seed cell. In other words, the seed is delivered freely and without obstruction tangentially outwardly of the rotating disc for an unencumbered and unobstructed delivery to the furrow, as illustrated at S2 in FIG. 18.

Figure 20:
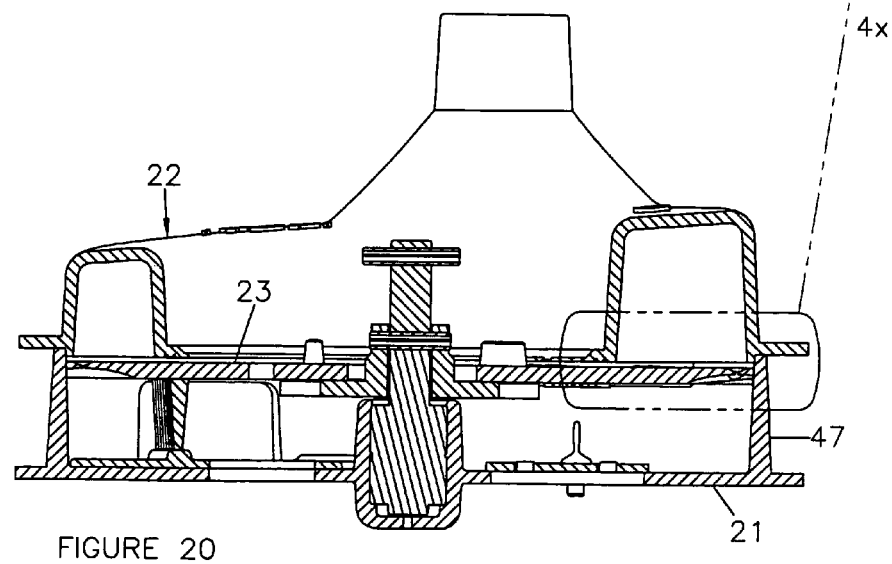
FIG. 20 is a cross section view taken through sight line 20—20 of FIG. 19.

FIG. 20 shows a diametric cross section of the meter, illustrating that the radial cross sectional area of the vacuum chamber increases when proceeding from the start wall 74 and the terminating wall 75 of the vacuum housing to the vacuum coupling 92.

Figure 21:
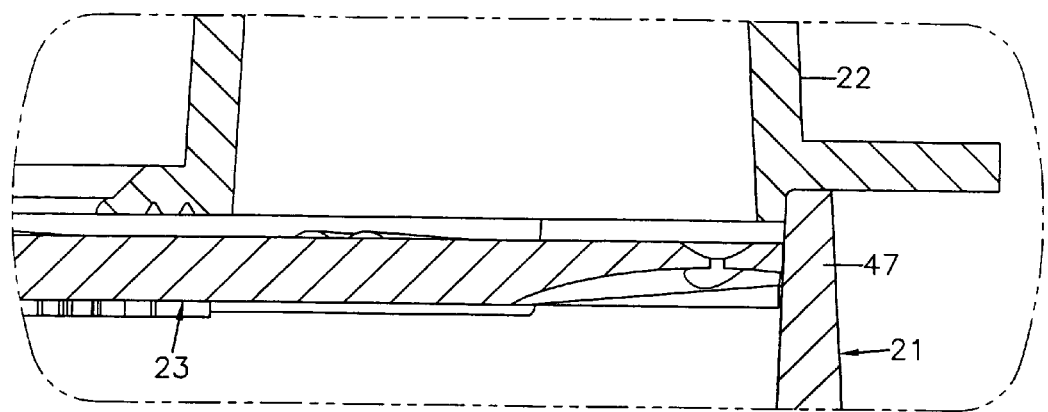
FIG. 21 is an enlarged view of the portion of FIG. 20 enclosed within the chain line loop of FIG. 20.

FIG. 21 illustrates the structure of the vacuum cover 22 which seals against the periphery of the opposing vacuum side of disc 23, and the engagement between side wall 47 of the seed housing 21 (which, together with vacuum cover 22 forms a housing, divided by the disc into a seed reservoir and a vacuum chamber) and the peripheral edge of the disc 23. In FIG. 21, the vacuum is not applied. When vacuum is applied to the vacuum housing, the perimeter of the vacuum side of the disc engages the opposing edge of the vacuum cover to form a seal. Again, the seal is not an absolute seal, and allows some air to pass, but not in significant quantities.

Having thus disclosed in detail an illustrated embodiment of the inventions, persons skilled in the art will be able to modify certain aspects of the structure which has been disclosed and to substitute equivalent elements for those described while continuing to practice the principal of the invention; and it is, therefore, intended that all such modifications and substitutions be covered as they are embraced within the spirit and scope of the appended claims.

We claim:

1. An air seed meter for an agricultural planter comprising:
   a housing defining a seed reservoir, a discharge chute and a vacuum chamber;
   a disc mounted in said housing for rotation about an axis and having a plurality of seed cells for seating and retaining seeds, said disc mounted to at least partially define said seed reservoir and said vacuum chamber, said disc having a beveled outer edge on a seed reservoir side thereof, each seed cell located adjacent said beveled edge and constructed to allow said seeds to release in a radially outward motion relative to said axis of rotation and into said discharge chute; and
   a singulator eliminating seed doubles from said seed cells, said singulator including a brush holder securing at least three brushes spaced circumferentially about said disc, each brush extending inwardly of said beveled edge of said disc to locations adjacent said seed cells to engage seeds adjacent said cells to dislodge duplicate seeds from each cell.

2. The meter of claim 1 further comprising
   an adjustment device including a rotary lever for locating said brush holder at a desired radial position relative to said disc.

3. The meter of claim 1 wherein said adjustment device includes a rotatable member defining a cam surface; a cam connected to said brush holder and engaging said cam surface, said cam surface extending progressively away from said axis of rotation of said disc; and a lever connected to said rotatable member to adjust the radial position of said brush holder relative to said axis of rotation of said disc.

4. The meter of claim 3 characterized in that a distal end of each of said brushes is located progressively radially inwardly of said seed cells proceeding in the direction of rotation of said disc.

5. The meter of claim 1 further comprising: a drive shaft rotatably mounted to said housing and extending through said disc and outwardly of said central opening of said vacuum cover for coupling to a planter drive externally and laterally outboard of said meter.

6. The meter of claim 5 further comprising a drive coupling connected to said drive shaft, said drive coupling including a plurality of drive members elongated laterally and inclined relative to a radial line such that each drive member extends closer to said axis of rotation of said disc proceeding in said direction of rotation of said disc; and wherein said disc defines a plurality of elongated openings sized and located to receive said drive members in driving engagement.

* * * * *